United States Patent
Sueda et al.

(10) Patent No.: US 9,552,172 B2
(45) Date of Patent: Jan. 24, 2017

(54) STORAGE PROCESSING APPARATUS, COMPUTER-READABLE RECORDING MEDIUM STORING PROGRAM FOR CONTROLLING STORAGE, AND STORAGE SYSTEM

(71) Applicant: FUJITSU LIMITED, Kawasaki-shi, Kanagawa (JP)

(72) Inventors: Naoya Sueda, Kawasaki (JP); Kazunori Kobashi, Yamato (JP); Osamu Hariya, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 115 days.

(21) Appl. No.: 14/474,331

(22) Filed: Sep. 2, 2014

(65) Prior Publication Data
US 2015/0095599 A1  Apr. 2, 2015

(30) Foreign Application Priority Data

Sep. 27, 2013  (JP) ................................ 2013-202071

(51) Int. Cl.
*G06F 3/06* (2006.01)

(52) U.S. Cl.
CPC ............. *G06F 3/065* (2013.01); *G06F 3/0604* (2013.01); *G06F 3/0664* (2013.01); *G06F 3/0665* (2013.01); *G06F 3/0683* (2013.01); *G06F 2003/0697* (2013.01)

(58) Field of Classification Search
None
See application file for complete search history.

(56) References Cited

U.S. PATENT DOCUMENTS

| | | | |
|---|---|---|---|
| 6,557,089 B1 * | 4/2003 | Reed ................... | G06F 11/1458 707/999.202 |
| 8,028,110 B1 | 9/2011 | Wigmore | |
| 8,060,710 B1 | 11/2011 | Don et al. | |
| 8,719,497 B1 * | 5/2014 | Don ....................... | G06F 13/28 707/674 |
| 8,819,374 B1 * | 8/2014 | Don ....................... | G06F 3/0647 711/112 |
| 2005/0262317 A1 | 11/2005 | Nakanishi et al. | |

(Continued)

FOREIGN PATENT DOCUMENTS

| | | |
|---|---|---|
| JP | 2005-338893 | 12/2005 |
| JP | 2009-093316 | 4/2009 |
| JP | 2009-251970 | 10/2009 |

OTHER PUBLICATIONS

Extended European Search Report dated Feb. 18, 2015 for corresponding European Patent Application No. 14183352.5, 7 pages.

*Primary Examiner* — Kaushikkumar Patel
(74) *Attorney, Agent, or Firm* — Fujitsu Patent Center

(57) ABSTRACT

A storage processing apparatus controls a second volume of a second virtual storage device storing a duplicate of a first volume of a first virtual storage device, the storage processing apparatus including a memory that stores a first identifier of the first volume received from the first virtual storage device; and a controller that establishes the first identifier stored in the memory as a second identifier of the second volume, and reports the first identifier established by the establishing in accordance with a notification request of the second identifier.

9 Claims, 20 Drawing Sheets

(56) References Cited

U.S. PATENT DOCUMENTS

| | | |
|---|---|---|
| 2006/0248304 A1* | 11/2006 | Hosouchi ............. G06F 3/0605 |
| | | 711/165 |
| 2008/0270695 A1 | 10/2008 | Ninose |
| 2009/0094403 A1 | 4/2009 | Nakagawa et al. |
| 2009/0254695 A1 | 10/2009 | Deguchi et al. |
| 2010/0199053 A1* | 8/2010 | Otani .................... G06F 3/0605 |
| | | 711/162 |
| 2012/0192006 A1* | 7/2012 | Qi ....................... G06F 11/0757 |
| | | 714/6.22 |
| 2012/0203988 A1 | 8/2012 | Nakagawa et al. |
| 2012/0233423 A1* | 9/2012 | Crawford ............ G06F 11/2069 |
| | | 711/162 |
| 2013/0138908 A1* | 5/2013 | Iwasaki ................ G06F 3/0607 |
| | | 711/165 |
| 2014/0122816 A1* | 5/2014 | Barnes .................... G06F 11/20 |
| | | 711/162 |
| 2014/0149666 A1 | 5/2014 | Nakagawa et al. |

* cited by examiner

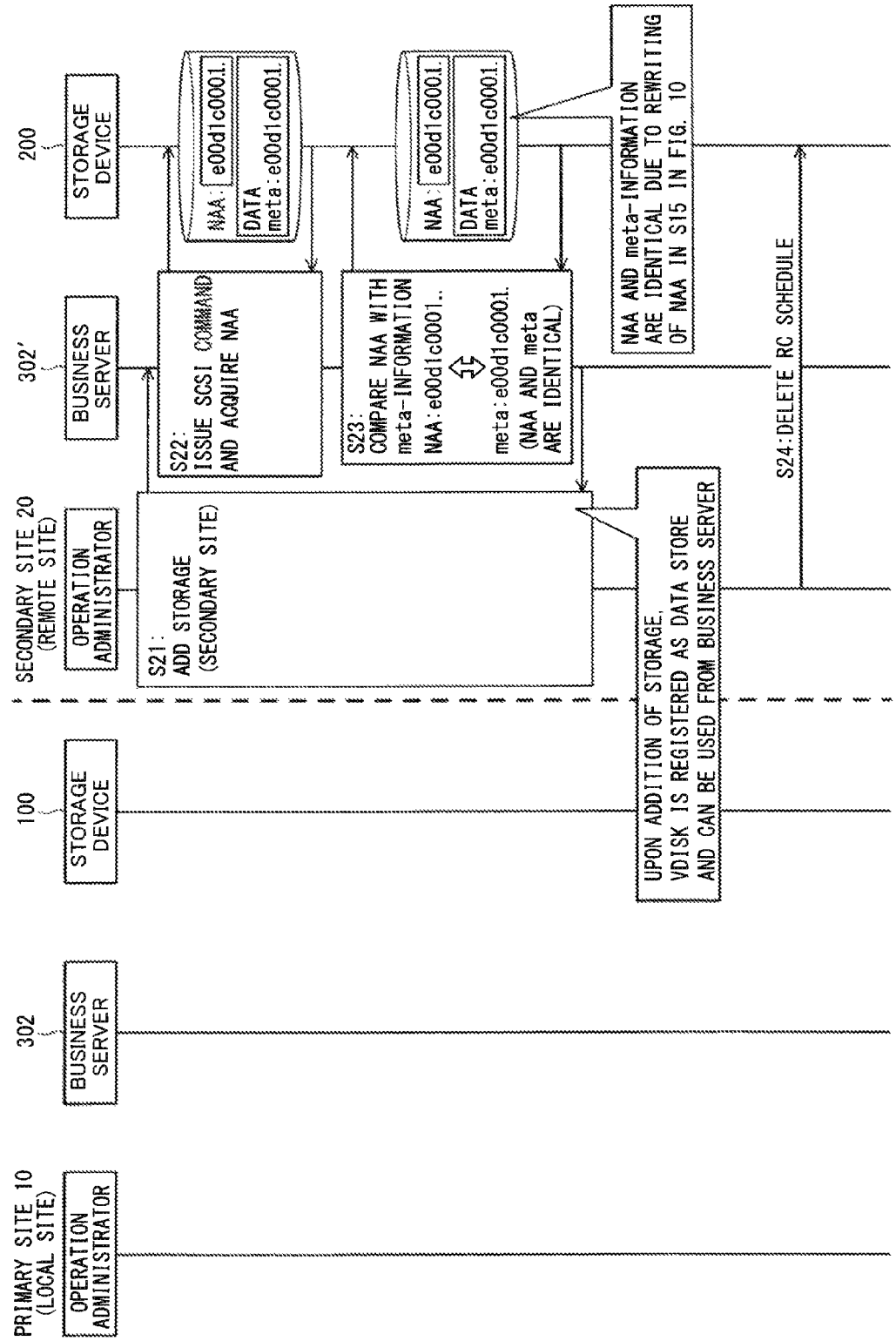

FIG. 12

| STEP NUMBER | OPERATION ADMINISTRATOR | PRIMARY SITE (LOCAL SITE) | | SECONDARY SITE (REMOTE SITE) | |
|---|---|---|---|---|---|
| | | BUSINESS SERVER | STORAGE DEVICE | BUSINESS SERVER | STORAGE DEVICE |
| S11 | ADD STORAGE (PRIMARY SITE) | | | | |
| S12 | | ISSUE SCSI COMMAND AND ACQUIRE NAA | NAA :e00d1c0001... meta: | | |
| S13 | | WRITE NAA AS meta-INFORMATION IN VDISK | NAA :e00d1c0001... meta:e00d1c0001... | | NAA :f00e2d0002... meta: |
| S15 | REWRITE NAA OF SECONDARY SITE TO VALUE IDENTICAL TO VALUE OF PRIMARY SITE (SECONDARY SITE) | | | | NAA :e00d1c0001... meta:e00d1c0001... |
| S16 | COPY DATA FROM PRIMARY SITE TO SECONDARY SITE | | | | NAA :e00d1c0001... meta:e00d1c0001... |
| S21 | ADD STORAGE (SECONDARY SITE) | | | | |
| S22 | | | | ISSUE SCSI COMMAND AND ACQUIRE NAA | |
| S23 | | | | COMPARE NAA WITH meta-INFORMATION | |
| END | | | | | |

STORAGE PROCESSING APPARATUS, COMPUTER-READABLE RECORDING MEDIUM STORING PROGRAM FOR CONTROLLING STORAGE, AND STORAGE SYSTEM

CROSS-REFERENCE TO RELATED APPLICATION

This application is based upon and claims the benefit of priority of the prior Japanese Patent Application No. 2013-202071, filed on Sep. 27, 2013, the entire contents of which are incorporated herein by reference.

FIELD

The present invention relates to a storage processing apparatus, a method of controlling storage, and a computer-readable recording medium storing a program for controlling storage.

BACKGROUND

Storages for virtual environments, i.e., virtual storage devices, have been used which are storage systems that have volume configurations and storage capacities not restricted by the volume configurations and storage capacities of physical storage devices. A virtual storage device includes an internal real storage unit (also referred to as real SU or, simply, SU) that controls the access to a physical storage device. A processor unit (PU) that manages the real storage unit creates virtual volumes (hereinafter referred to as VDISKs). Physical storage areas of the real storage unit are assigned to the virtual storage areas in the VDISK.

An example virtual storage device will now be described that includes a real SU having four groups of redundant arrays of inexpensive disks (RAIDs) and eight logical units (LUNs) each having a capacity of one terabyte (TB). The virtual storage device provides any number of VDISKs having any capacity, e.g., eighty VDISKs each having a capacity of 100 GB, for a business server used in business systems, regardless of the number and size of real LUNs.

Some virtual storage devices can expand the storage areas of the entire virtual storage devices if the devices need additional storages. For example, the storage area of such a virtual storage device can be expanded in units of a combination of a PU and an SU, which manage the real storage unit. The addition of an extended set consisting of a combination of a PU and an SU to a virtual storage device is referred to as "scaling out." A virtual storage device that has the ability to scale out is known as a "scale-out virtual storage device."

The reliability of an entire information processing system can be enhanced in preparation of disasters and system updates through the installation of multiple virtual storage devices at sites geographically remote from each other.

In such a configuration, the virtual storage device used by the business server is installed at a local or primary site, and a backup virtual storage device is installed at a remote or secondary site. The PU of the virtual storage device at the primary site and the PU of the virtual storage device at the remote site are connected with a data transmission line via a switch (SW). In preparation for damage of the local site, the data stored at the local site is duplicated to (backed up at) the remote site through a remote copy (RemoteCopy (RC)) session.

If the local site is damaged by a disaster, the service can be continued through the use of the data duplicated in the remote site. To continue the service, the remote copy session must be deleted. This is because data cannot be written in the VDISK of the secondary site if the remote copy session is active.

FIG. 20 illustrates a site-switching process in a conventional virtual storage system in case a local site is damaged by a disaster.

In Step S101, the local site is damaged in a disaster.

In Step S102, an operation administrator of the information processing system instructs the cancellation of a schedule of remote copy of the virtual storage device with a web GUI or a command line interface (CLI) of a management server at the remote site.

In Step S103, the schedule of remote copy of the virtual storage device at the remote site is cancelled.

In Step S104, the secondary site is designated as a primary site, and the service provided by the business server is resumed using the VDISKs of the latest primary site.

A business server running virtual software, such as VMWare ESXi (trademark), requires resigning (re-registration) for each VDISK to use the data sent to a secondary site through remote copy and resume the service.

The resigning is a process of copying a volume (VDISK) registered as a data store in a virtual storage device and registering the duplicated VDISK as a data store. During the resigning, the identifier of the original VDISK is compared to the identifier of the duplicated VDISK. If the identifiers do not match, the identifier of the duplicated VDISK is rewritten. For example, ESXi uses VDISK identifiers that conform to the format of T11 network address authority (NAA).

NAA conforms to the convention associated with Internet small computer serial interface (iSCSI) node names in the RFC-3980 iSCSI. The NAA identifier contains a serial number unique to VX and a volume number unique to the created volume. The NAA identifier corresponds to a value unique to each volume (VDISK).

The resigning, which must be performed on every VDISK, requires five or more minutes every VDISK. For example, the resigning of 300 VDISKs requires 5 hours 48 minutes and 7 seconds.

A scale-out virtual storage device has several thousands to several tens of thousands VDISKs. Thus, the resigning process is extremely time-consuming, preventing the practical switching of a virtual storage device between sites.

SUMMARY

A storage processing apparatus that controls a second volume of a second virtual storage device storing a duplicate of a first volume of a first virtual storage device is provided, the storage processing apparatus including a memory that stores a first identifier of the first volume received from the first virtual storage device; and a controller that establishes the first identifier stored in the memory as a second identifier of the second volume, and reports the first identifier established by the establishing in accordance with a notification request of the second identifier.

A computer-readable recording medium storing a storage control program for controlling a second volume of a second virtual storage device storing a duplicate of a first volume of a first virtual storage device is also provided, the program causing a computer to store a first identifier of the first volume received from the first virtual storage device in a memory; establish the first identifier stored in the memory as a second identifier of the second volume; and report the first identifier established as the second identifier of the second volume in accordance with a notification request of the second identifier.

A storage system is also provided, the storage system including a first virtual storage device comprising a first volume; and a second virtual storage device comprising a second volume, the first virtual storage device further including a memory that stores a first identifier of the first volume received from the first virtual storage device; and a controller that establishes the first identifier stored in the memory as a second identifier of the second volume, and reports the first identifier established by the establishing in accordance with a notification request of the second identifier.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates the process of adding a VDISK having a false identifier to a virtual storage device according to an embodiment;

FIG. 12 is a table showing the processes illustrated in FIGS. 10 and 11;

DESCRIPTION OF EMBODIMENTS

A storage processing apparatus, a method controlling storage, and a program for controlling storage according to embodiments will now be described with reference to the accompanying drawings.

The embodiments described below are mere examples, and various modifications and technological applications that are not described in the embodiments are not to be excluded from the scope of the invention. The embodiments may be modified in various ways within the scope of the invention, and the embodiments and modifications may be combined.

(A) Configuration

The configuration of virtual storage devices 100 and 200 according to an embodiment will now be described.

Figure 1:
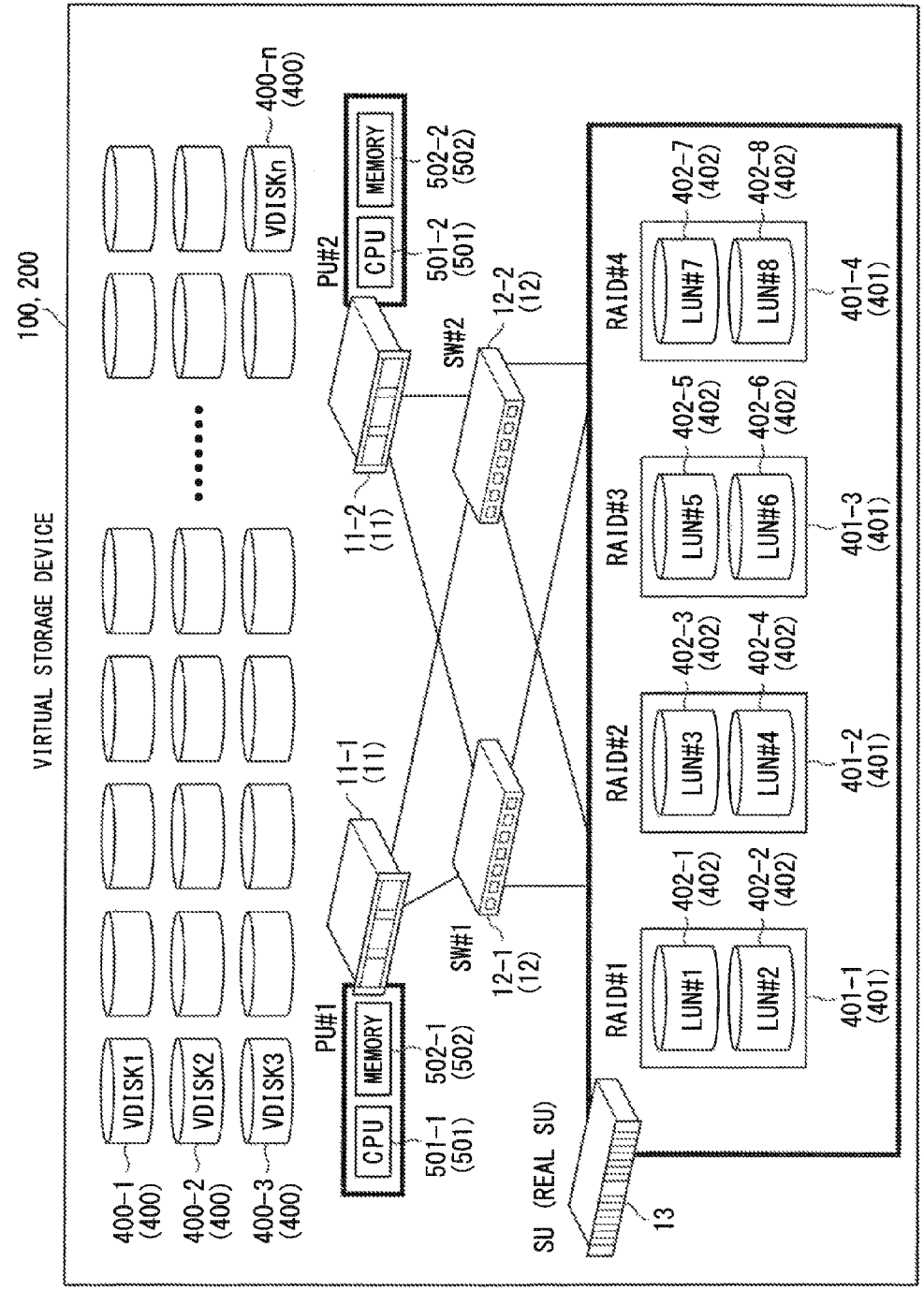
FIG. 1 illustrates the hardware configuration of a virtual storage device according to an embodiment.
Figure 3:
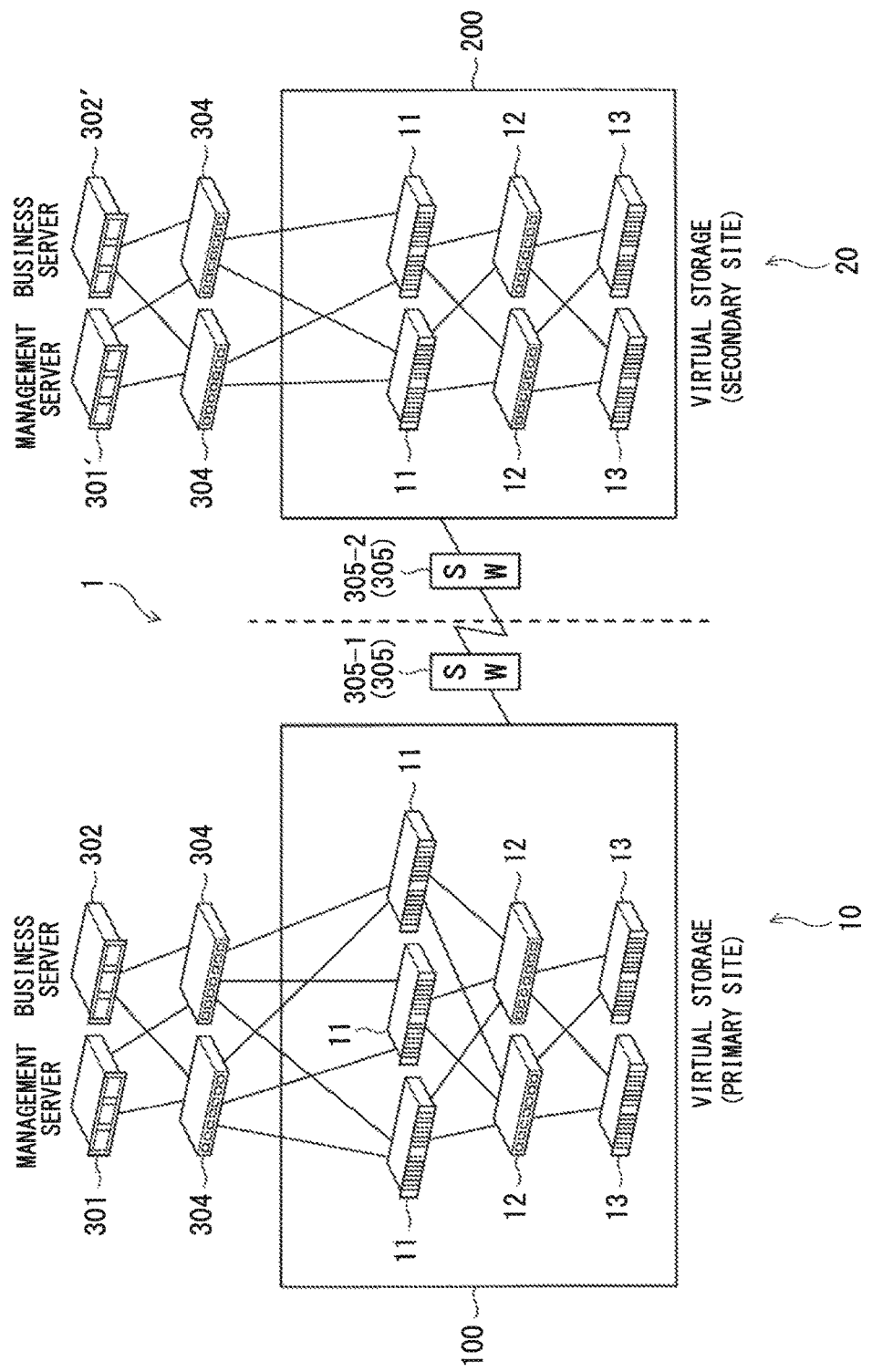
FIG. 3 illustrates the hardware configuration of an information processing system equipped with a virtual storage device according to this embodiment.

FIG. 1 illustrates the hardware configuration of a first virtual storage device 100 and a second virtual storage device 200 according to an embodiment. FIG. 3 illustrates the hardware configuration of an information processing system (storage system) 1 equipped with the virtual storage devices 100 and 200 according to this embodiment.

The virtual storage devices 100 and 200 each have n virtual volumes (virtual disks (VDISKs)) 400-1 to 400-n (where n is an integer of 1 or more, e.g., 80). Each of virtual storage devices 100 and 200 has a predetermined capacity and a configuration that are not restricted by the physical volume configuration and capacity of the storage device.

The virtual storage device 100 provides a storage area to a business server 302, which will be described below with reference to FIG. 3, and is mutually connectable to the business server 302, for example, via a storage area network (SAN). The business server 302 uses the virtual storage device 100 for operation. In the description below, the site at which the virtual storage device 100 is installed is referred to as a primary or local site 10.

The virtual storage device 200 is a storage system that substitutes for the virtual storage device 100 during a disaster or site switching and is connected to the virtual storage device 100. In the descriptions below, the installation site of the virtual storage device 200 is referred to as a secondary or remote site 20.

The configuration of the VDISKs 400-1 to 400-n will be described below with reference to FIG. 4.

To provide the VDISKs 400-1 to 400-n, each of the virtual storage devices 100 and 200 is provided with PUs 11-1 and 11-2, SW's 12-1 and 12-2, and SU 13.

The PUs 11-1 and 11-2 are controllers that control the operation of the virtual storage device 100 (200) and control SUs 13 and 13', which are described below, to provide virtual volumes (VDISKs 400). The PUs 11-1 and 11-2 receive input/output (I/O) commands, such as a read/write command, from the business server 302 (refer to FIG. 3) and performs various control processes. The PU 11-1 includes a central processing unit (CPU) 501-1 and a memory 502-1, and the PU 11-2 includes a CPU 501-2 and a memory 502-2. The PUs 11-1 and 11-2 respectively execute storage control programs stored in advance in the memories 502-1 and 502-2 to function as storage control units 114 and 124, which are described below with reference to FIG. 6 and other drawings.

The SW's 12-1 and 12-2 are network switches and are connected to the PUs 11-1 and 11-2 and the SU 13.

The SU 13 is a real storage unit including RAIDs 401-1 to 401-4 and controls the access to the RAIDs 401-1 to 401-4. In this embodiment, the PUs 11-1 and 11-2 are both connected to the SU 13 for redundancy. That is, the PUs 11-1 and 11-2 are duplexed. Usually, the PU 11-1 functions as the primary PU and controls the PU 11-2, which is the secondary PU, to control the operation of the entire virtual storage device 100. If the PU 11-1 fails, the PU 11-2 substitutes for and functions as the primary PU to continue the operation of the PU 11-1.

The RAIDs 401-1 to 401-4 make up a RAID group including multiple storage devices, such as hard disks. The RAIDs 401-1 to 401-4 are each equipped with two logical units (LUNs). Specifically, the RAID 401-1 includes LUNs 402-1 and 402-2; the RAID 401-2 includes LUNs 402-3 and 402-4; the RAID 401-3 includes LUNs 402-5 and 402-6; and the RAID 401-4 includes LUNs 402-7 and 402-8.

Reference signs 11-1 and 11-2 each indicate a specific PU, while reference sign 11 indicates any one or both of the PUs 11-1 and 11-2. The PUs 11-1 and 11-2 may also be indicated as PUs #1 and #2, respectively.

Reference signs 12-1 and 12-2 each indicate a specific SW, while reference sign 12 indicates any one or both of the SWs 12-1 and 12-2. The SWs 12-1 and 12-2 may also be indicated as SWs #1 and #2, respectively.

Figure 5:
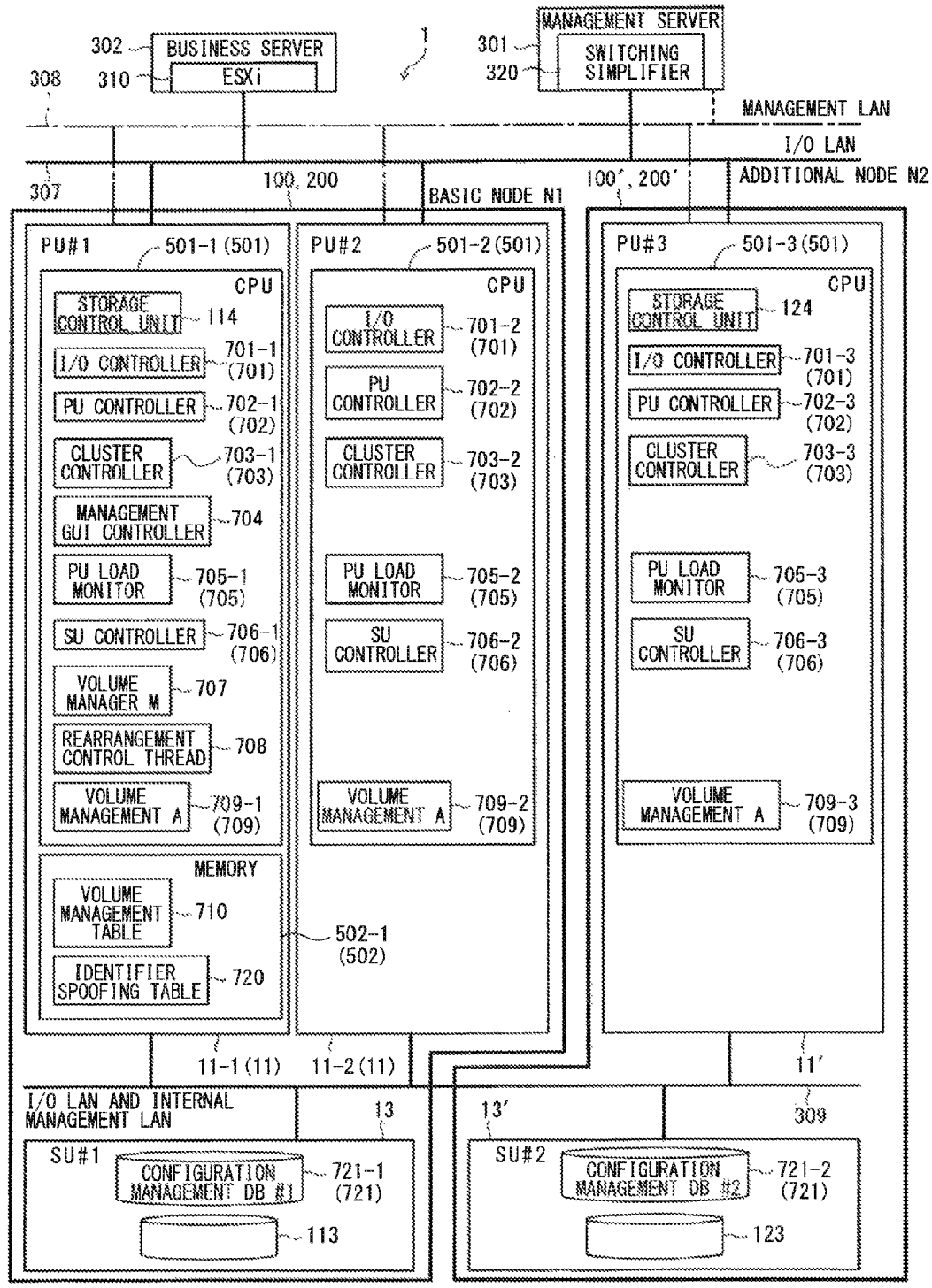
FIG. 5 illustrates the functional configuration of a virtual storage device according to an embodiment.

Reference signs 13, 13', 13", and so on each indicate a specific SU as illustrated in FIG. 5, for example, while reference sign 13 indicates any one or more SUs among the SUs 13, 13', 13", and so on.

Reference signs 401-1 to 401-4 each indicate a specific RAID, while reference sign 401 indicates any one or more RAIDs among the RAIDs 401-1 to 401-4. The RAIDs 401-1 to 401-4 may also be indicated as RAIDs #1 to #4, respectively.

Reference signs 402-1 to 402-8 each indicate a specific LUN, while reference sign 402 indicates any one or more LUNs among the LUNs 402-1 to 402-8. The LUNs 402-1 to 402-8 may also be indicated as LUNs #1 to #8, respectively.

Reference signs 400-1 to 400-*n* each indicate a specific VDISK, while reference sign 400 indicates any one or more VDISKs among the VDISKs 400-1 to 400-*n*. The VDISKs 400-1 to 400-*n* may also be indicated as VDISKs #1 to #n, respectively.

Reference signs 501-1, 501-2, and so on each indicate a specific CPU in the PUs 11, 11', and 11", while reference sign 501 indicates any one or more CPUs among the CPUs 501-1, 501-2, and so on.

Reference signs 502-1, 502-2, and so on each indicate a specific memory in the PUs 11, 11', and 11", while reference sign 502 indicates any one or more memories among the memories 502-1, 502-2, and so on.

The virtual storage devices 100 and 200 are scale-out virtual storage devices having expandable storage capacities.

Figure 2:
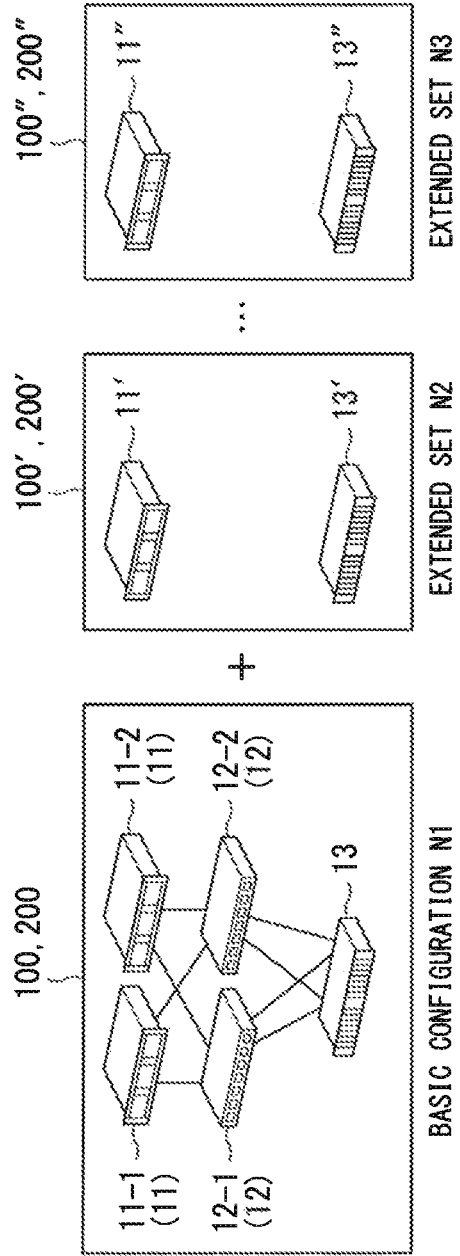
FIG. 2 illustrates the expansion of a virtual storage device according to this embodiment.

FIG. 2 illustrates the expansion of the virtual storage devices 100 and 200 according to this embodiment.

The virtual storage devices 100 and 200 can expand (scale out) the storage areas of the entire virtual storage devices 100 and 200, respectively, if an additional storage area is required.

Specifically, the virtual storage device 100 (200) can expand its entire storage area in units of a combination of one PU 11 and one SU 13. In FIG. 2, the basic configuration (N1) of the virtual storage device 100 (200) shown in FIG. 1 can be expanded through the addition of an extended set (N2) 100' (200') including a PU 11' and an SU 13' and/or another extended set (N3) 100" (200") including a PU 11" and an SU 13".

In the description below, the PUs 11-1 and 11-2, the SWs 12-1 and 12-2, and the SU 13 in the virtual storage device 100 (200) may also be referred to as "basic node." The extended sets 100' (200') and 100" (200") added to the virtual storage device 100 (200) may also be referred to as "additional node."

With reference to FIG. 3, the information processing system 1 includes a primary site 10 and a secondary site 20.

The primary site 10 includes a management server 301, a business server 302, SWs 304, an SW 305-1, and a virtual storage device 100.

The management server 301 is a computer (information processor) operated by an operation administrator for the management of the information processing system 1, such as the management of the virtual storage device 100, and includes a CPU, a memory, a disk drive, a display, an interface (I/F), a keyboard, and a mouse, which are not shown.

The business server 302, for example, is a computer (information processor) that functions as a server and is used in the operation of the information processing system 1. The business server 302 receives and sends various items of data, such as small computer system interface (SCSI) commands and responses, from and to the virtual storage device 100 in accordance with a storage connection protocol. The business server 302 sends a disk access command (I/O command), such as a read/write command, to the virtual storage device 100 to read and write data in and from, respectively, the storage area of the virtual storage device 100.

The business server 302 executes a business application (not shown) and, for example, includes a CPU, a memory, a disk drive, a display, an I/F, a keyboard, and a mouse, which are not shown.

The virtual storage device 100 is mutually connected to the business server 302 via an SAN with SWs 304.

The secondary site 20 includes a management server 301', a business server 302', SWs 304, an SW 305-2, and a virtual storage device 200.

The management server 301', which is a back-up server of the management server 301, for example, is a computer (information processor) that functions as a server. The management server 301' substitutes for the management server 301, for example, if the primary site 10 is damaged a disaster. The management server 301' has functions and a configuration substantially identical to the management server 301.

The business server 302', which is a back-up server of the business server 302, for example, is a computer (information processor) that functions as a server. The business server 302' substitutes for the business server 302, for example, if the primary site 10 is damaged in a disaster. The business server 302' has functions and a configuration substantially identical to the business server 302.

The virtual storage device 200 is a storage system that substitutes for the virtual storage device 100 during a disaster or site switching and is connected to the virtual storage device 100 via the SWs 305-1 and 305-2.

The SWs 304 are network switches that are connected to both the business server 302 and the virtual storage device 100. The SWs 304 are duplexed such that the business server 302 can continue to access the virtual storage device 100 even if one of the SWs 304 fails.

The SWs 305-1 and 305-2 are network switches that are connected to both the primary site 10 and the secondary site 20.

Specifically, the primary site 10 is equipped with the SW 305-1 connected to the virtual storage device 100, and the secondary site 20 is equipped with the SW 305-2 connected to the virtual storage device 200. The SWs 305-1 and 305-2 are connected to mutually connect the primary site 10 and the secondary site 20.

Reference signs 304-1 and 304-2 each indicate a specific SW connected to both the business server 302 and the virtual storage device 100, while reference sign 304 indicates any one or both of the SWs 304-1 and 304-2.

Reference signs 305-1 and 305-2 each indicate a specific SW connected to both the primary site 10 and the secondary site 20, while reference sign 305 indicates any one or both of the SWs 305-1 and 305-2.

Figure 4:
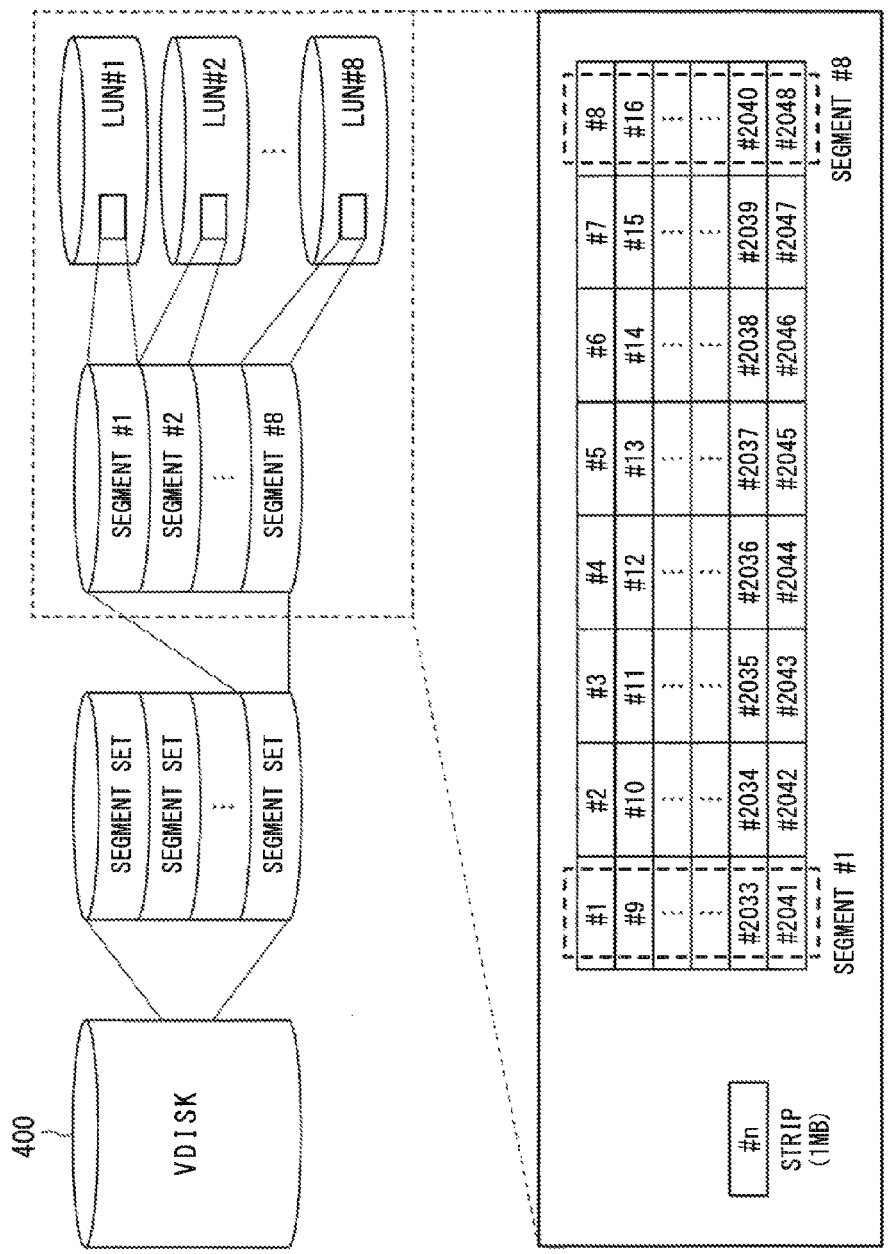
FIG. 4 illustrates the configuration of a VDISK provided by a virtual storage device according to an embodiment.

FIG. 4 illustrates the configuration of a VDISK 400 provided by a virtual storage device according to an embodiment.

The virtual storage devices 100 and 200 can access data through wide striping. Wide striping is a technique of distributing data in a single volume among multiple LUNs and accessing this data in units of strips having predetermined lengths.

With reference to FIG. 4, a VDISK 400 is a collection of 2-gigabyte (GB) segment sets. Each segment set, for example, is a collection of eight 256-megabyte (MB) segments #1 to #8. The segments #1 to #8 are respectively assigned to LUNs #1 to #8 in the SU 13. The user's data is recorded in units of strips having a predetermined length (e.g., 1 MB). The strips are sequentially recorded in different segments.

FIG. 5 illustrates the functional configuration of the virtual storage devices 100 and 200 according to an embodiment.

The virtual storage device 100 (200) illustrated in FIG. 5 is scaled out by adding a node N2 to the basic node N1.

The basic node N1 includes PUs 11-1 and 11-2 and an SU 13. The additional node N2 includes a PU 11' and an SU 13'.

The PUs 11-1 and 11-2 in the basic node N1, the PU 11' in the additional node N2, and the management server 301 are connected via a management local area network (LAN) 308.

The management server 301 includes a switching simplifier 320 and a management graphical user interface (GUI) (not shown).

The switching simplifier 320 sets the value of the identifier of a duplicated VDISK 400 (refer to FIG. 1) at the secondary site 20 to the same value as that of the identifier of the original VDISK 400 at the primary site 10. Hereinafter, the process of rewriting the value of an identifier of a VDISK 400 at the secondary site 20 to the same value as that of an identifier of a VDISK 400 at the primary site 10 is referred to as "identifier spoofing." An identifier of a VDISK 400 may be an NAA identifier in ESXi. In the description below, an NAA identifier is used.

Identifier spoofing exempts the switching simplifier 320 from resigning every VDISK 400; resigning has been required for the business server 302 to resume operation using the data transferred to the secondary site 20 through remote copy. The duplicated VDISK 400 at the secondary site 20 may be referred to as "S-VDISK 400," and the original VDISK 400 at the primary site 10 may be referred to as "P-VDISK 400." A VDISK 400 may be referred to as "storage."

The detailed configuration of the switching simplifier 320 will be described below with reference to FIG. 7.

With reference to FIG. 5, the PUs 11-1 and 11-2 in the basic node N1, the PU 11' in the additional node N2, and the business server 302 are connected via an I/O LAN and an internal management LAN 309. The PUs 11-1, 11-2, and 11', and the SUs 13 and 13' are connected via the I/O LAN and the internal management LAN 309.

The SU 13 includes a configuration management database (DB) 721-1 and a first storage unit 113, and the SU 13' includes a configuration management DB 721-2 and a second storage unit 123.

The storage units 113 and 123 each include at least one storage device. The storage device may be a physical storage device, such as a hard disk drive (HDD), an optical disk, a flash memory, and a magnetic tape, or may be a logical storage device, such as a LUN.

The PUs 11-1, 11-2, and 11' are connected to the SUs 13 and 13' via the LANs 309. Thus, the PUs 11-1, 11-2, and 11' can all directly access both the SUs 13' and 13.

The virtual storage device 100 (200) can access data through wide striping. Wide striping can avoid low performance due to heavy access and maintains stable performance without complicated performance design involving traffic from the servers and the physical locations of the volumes.

The configuration management DB 721-1 stores configuration information on the configuration of the storage area in the first storage unit 113, and the configuration management DB 721-2 stores the configuration of the storage area in the second storage unit 123. The configuration management DBs 721-1 and 721-2 each includes a volume management table 710 and an identifier spoofing table 720. Specifically, the configuration management DBs 721-1 and 721-2 are written in the memory 502 of the PU 11 to load the volume management table 710 and the identifier spoofing table 720. That is, the memory 502 functions as a memory that stores the identifier spoofing table 720.

The memory 502 of the PU 11 may be a non-volatile memory or an HDD.

The business server 302 runs virtual storage software 310, such as ESXi, and accesses the VDISKs 400 of the virtual storage device 100 for operation.

For simplification, FIG. 5 does not show the management server 301' and the business server 302' at the secondary site 20. The management server 301' also has a switching simplifier 320. The business server 302' also runs virtual storage software 310, such as ESXi.

The PU 11-1 includes a storage control unit 114, an I/O controller 701-1, a PU controller 702-1, a cluster controller 703-1, a management GUI controller 704, a PU load monitor 705-1, an SU controller 706-1, a volume manager (M) 707, a volume management agent (A) 709-1, a volume management table 710, and an identifier spoofing table 720.

The PU 11-2 includes an I/O controller 701-2, a PU controller 702-2, a cluster controller 703-2, a PU load monitor 705-2, an SU controller 706-2, and a volume management agent 709-2.

The PU 11' includes a storage control unit (storage processing apparatus) 124, an I/O controller 701-3, a PU controller 702-3, a cluster controller 703-3, a PU load monitor 705-3, an SU controller 706-3, and a volume management agent 709-3.

The storage control unit 114 controls the first storage unit 113 in the SU 13. The storage control unit 114 is provided through the execution of a storage control program by a CPU 501-1 in the PU 11-1.

The storage control unit 124 controls the second storage unit 123 in the SU 13'. The storage control unit 124 is provided through the execution of a storage control program by a CPU 501-3 in the PU 11'.

The storage control units 114 and 124 have substantially identical functions and configurations. The storage control units 114 and 124 will be described below with reference to FIG. 6.

The I/O controllers 701-1 to 701-3 receive I/O requests from the business server 302 and process these requests.

The PU controllers 702-1, 702-2, and 702-3 respectively control the PUs 11-1, 11-2, and 11'.

The cluster controller 703-1 clusters the PUs 11. A cluster consists of the PUs 11-1, 11-2, and 11'.

The cluster controllers 703-2 and 703-3 recognize the cluster of the PUs 11-1, 11-2, and 11' formed by the cluster controller 703-1.

The management GUI controller 704 analyzes the status of the virtual storage device 100 (200) and creates new volumes in accordance with instructions from the management server 301.

The PU load monitor 705-1, 705-2, and 705-3 monitor the loads applied to the PUs 11-1, 11-2, and 11', respectively.

The SU controllers 706-1, 706-2, and 706-3 control the SUs 13 and 13'.

The volume manager 707 controls the volume management agents 709-1 to 709-3. Specifically, the volume manager 707 starts a rearrangement control thread 708 and instructs the volume management agents 709-1 to 709-3 to execute the thread.

The volume management agents 709-1 to 709-3 manage the volumes under the control of the volume manager 707.

The volume management table 710 stores configuration information on every VDISK 400 and is read from the configuration management DBs 721-1 and 721-2 and written in a memory of the PU 11 (not shown). The volume management table 710 stores information on the assignment of the storage devices (e.g. HDDs) in the storage units 113 and 123 to the corresponding VDISKs 400.

The identifier spoofing table 720 is used in the simplified site-switching process. The detailed configuration of the identifier spoofing table 720 will be described below with reference to FIG. 8. To manage false NAA identifiers to be used in the simplified site-switching process, an SVE-M, which is described below, switches between the state of the NAA identifiers of the DB stored in the table and the state of the NAA identifier in the DB of the tgtd.

If the PU 11-1 of the virtual storage device 100 is damaged, the PU 11-2 or 11' substitutes for the PU 11-1.

Figure 6:
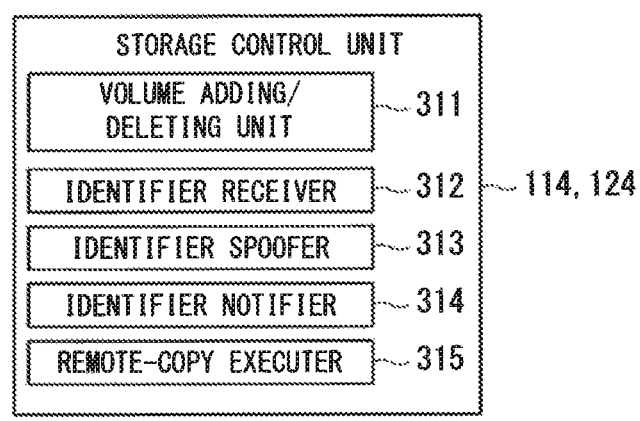
FIG. 6 illustrates the functional configuration of a storage control unit according to an embodiment.

FIG. 6 illustrates the functional configuration of the storage control units 114 and 124 according to an embodiment.

The storage control units 114 and 124 each includes a volume adding/deleting unit (volume adder) 311, an identifier receiver 312, an identifier spoofer (controller) 313, an identifier notifier 314, and a remote-copy executer (copier) 315.

The volume adding/deleting unit 311 adds or deletes a VDISK 400 to the virtual storage device 100 (200).

The identifier receiver 312 receives an identifier from an identifier acquirer 324 of a switching simplifier 320, which is described below.

The identifier spoofer 313 receives an instruction from the identifier acquirer 324 of the switching simplifier 320 and sets the value of the NAA identifier of the duplicated VDISK 400 at the secondary site 20 to the same value as that of the NAA identifier of the original VDISK 400 at the primary site 10. Specifically, the identifier spoofer 313 rewrites the value of the NAA identifier in a false-identifier storage area 722 (refer to FIG. 8) of the identifier spoofing table 720, instead of actually rewriting the NAA identifier of every VDISK 400 stored in the configuration management DBs 721-1 and 721-2.

In response to a notification request of an NAA identifier of a duplicated VDISK 400 from the business server 302 (302'), the identifier notifier 314 carries out an identifier notification process.

Specifically, in response to a notification request of an NAA identifier of a duplicated VDISK 400 from the business server 302 (302'), the identifier notifier 314 determines whether identifier spoofing is performed on the duplicated VDISK 400. The identifier notifier 314 determines whether identifier spoofing is performed on the duplicated VDISK 400 based on the value of an identifier spoofing flag 723 in the identifier spoofing table 720 (refer to FIG. 8).

If identifier spoofing is not performed, the identifier notifier 314 reports the value of an identifier storage area 721 in the identifier spoofing table 720, which is the value of the original NAA identifier of the duplicated VDISK 400, to the business server 302 (302'). That is, if identifier spoofing is not performed, the identifier notifier 314 reports the original NAA identifier (without spoofing) of the duplicated VDISK 400 to the business server 302 (302').

If identifier spoofing is performed, the identifier notifier 314 reports the value of the false-identifier storage area 722 in the identifier spoofing table 720 as the value of the NAA identifier of the duplicated VDISK 400 to the business server 302 (302'). That is, if identifier spoofing is performed, the identifier notifier 314 reports the false NAA identifier spoofed by the identifier spoofer 313 to the business server 302 (302').

The identifier notification process carried out by the identifier notifier 314 will be described below with reference to FIG. 19.

The remote-copy executer 315 duplicates the data in the original VDISK 400 at the primary site 10 to a VDISK 400 at the secondary site 20.

Figure 7:
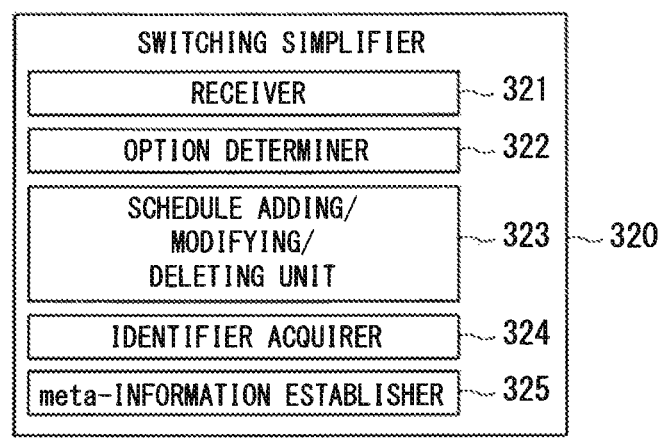
FIG. 7 illustrates the functional configuration of a switching simplifier according to an embodiment.

FIG. 7 illustrates the functional configuration of a switching simplifier 320 according to an embodiment.

The switching simplifier 320 includes a receiver 321, an option determiner 322, a schedule adding/modifying/deleting unit 323, an identifier acquirer 324, and a meta-information establisher 325.

The receiver 321 receives commands for adding, modifying, and deleting schedules of remote copy from an operation administrator of the information processing system 1 via a web GUI or CLI of a management server 301 (301'). The web GUI allows an operation administrator to establish environmental settings, carry out operations, and confirm the status of the virtual storage device 100 (200) with a web browser.

The option determiner 322 reads a simplification option of switching sites that is assigned by the command for adding, modifying, or deleting a schedule of remote copy sent from the operation administrator. Details of a simplification option of site switching will be described below.

The schedule adding/modifying/deleting unit 323 executes a command for adding, modifying, or deleting a schedule of remote copy. As described below, the identifier spoofer 313 rewrites the value of the NAA identifier of an S-VDISK 400 to the value of an NAA identifier of a P-VDISK 400 at the timing of adding or modifying a schedule of remote copy.

The identifier acquirer 324 instructs the business server 302 to issue a SCSI command to the virtual storage device 100 (200) and acquire NAA identifiers from the VDISKs 400 of the virtual storage device 100 (200). Since the procedures of acquiring an NAA identifier through a SCSI command is known, description thereof will be omitted.

The meta-information establisher 325 writes the NAA identifier acquired by the identifier acquirer 324 in a VDISK 400 as meta-information in the business server 302. This adds a VDISK 400 to the ESXi data store.

Figure 8:
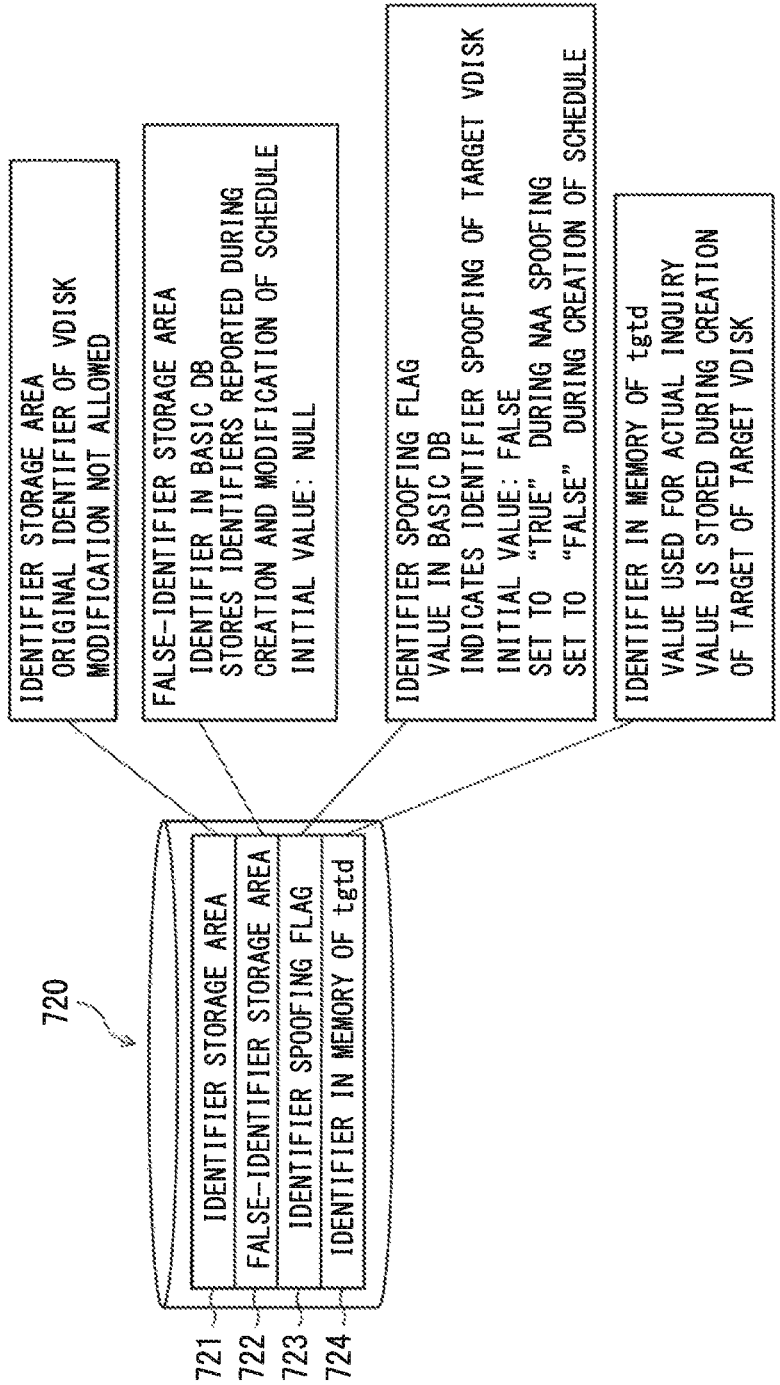
FIG. 8 illustrates the configuration of an identifier spoofing table used by a virtual storage device according to an embodiment.

FIG. 8 illustrates the configuration of an identifier spoofing table 720 used by the virtual storage devices 100 and 200 according to an embodiment.

The identifier spoofing table 720 includes the following fields: an identifier storage area 721, a false-identifier storage area 722, and an identifier spoofing flag 723. The identifier spoofing table 720 may optionally include an identifier 724 in a tgtd memory.

The identifier storage area 721 stores regular NAA identifiers of the VDISKs 400. The regular NAA identifiers of the VDISKs 400 are acquired by the identifier receiver 312 and stored in the identifier storage area 721 when a VDISK 400 is added by the business server 302.

The false-identifier storage area 722 stores false NAA identifiers that are to be used in a simplified site-switching process that eliminates resigning of the NAA identifiers. A false NAA identifier is stored in the false-identifier storage area 722 by the identifier spoofer 313. The initial value of the false-identifier storage area 722 is NULL.

The identifier spoofing flag 723 stores a value that indicates whether a false NAA identifier of a VDISK 400 has been stored in the false-identifier storage area 722. If the NAA identifier of a VDISK 400 is spoofed by the identifier spoofer 313, the value of the identifier spoofing flag 723 is set to "true." The value of the identifier spoofing flag 723 is set to "false" during the creation of a schedule, as described below. The initial value of the identifier spoofing flag 723 is "false."

The identifier 724 in the tgtd memory stores a value of an NAA identifier loaded in a memory (not shown) in a tgtd 615, which is described below with reference to FIGS. 16 and 17.

According to an embodiment, the CPUs 501 of PUs 11, 11', and 11" execute storage control programs to provide the functions of the storage control units 114 and 124, the volume adding/deleting unit 311, the identifier receiver 312, the identifier spoofer 313, the identifier notifier 314, and the remote-copy executer 315.

The programs that provide the functions of the storage control units 114 and 124, the volume adding/deleting unit 311, the identifier receiver 312, the identifier spoofer 313, the identifier notifier 314, and the remote-copy executer 315 are stored on a computer-readable recording medium, such as a flexible disk, a CD (e.g., CD-ROM, CD-R, or CD-RW), a DVD (e.g., DVD-ROM, DVD-RAM, DVD-R, DVD+R, DVD-RW, DVD+RW, or HD DVD), a Blu-ray disk, a magnetic disk, an optical disk, or a magneto-optical disk. A computer reads the relevant programs from the recording medium and transfers the programs to an internal or external storage device. Alternatively, the programs may be stored on a storage device (recording medium), such as a magnetic disk, an optical disk, or a magneto-optical disk, and provided from the storage device to the computer via a communication path.

The functions of the storage control units 114 and 124, the volume adding/deleting unit 311, the identifier receiver 312, the identifierspoofer 313, the identifier notifier 314, and the remote-copy executer 315 are provided by a microprocessor (the CPUs 501 of the PUs 11, 11', and 11" in this embodiment) of the computer executing the corresponding programs stored in an internal storage device (such as the memories 502 of the PUs 11, 11', and 11" in this embodiment). The corresponding programs stored on the recording medium may be read and executed by the computer.

A CPU (not shown) of the management server 301 executes storage control programs to provide the functions of the switching simplifier 320, the receiver 321, the option determiner 322, the schedule adding/modifying/deleting unit 323, the identifier acquirer 324, and the meta-information establisher 325.

The programs that provide the functions of the switching simplifier 320, the receiver 321, the option determiner 322, the schedule adding/modifying/deleting unit 323, the identifier acquirer 324, and the meta-information establisher 325 are stored on a computer-readable recording medium, such as a flexible disk, a CD (e.g., CD-ROM, CD-R, or CD-RW), a DVD (e.g., DVD-ROM, DVD-RAM, DVD-R, DVD+R, DVD-RW, DVD+RW, or HD DVD), a Blu-ray disk, a magnetic disk, an optical disk, or a magneto-optical disk. A computer reads the relevant programs from the recording medium and transfers the programs to an internal or external storage device. Alternatively, the programs may be stored on a storage device (recording medium), such as a magnetic disk, an optical disk, or a magneto-optical disk, and provided from the storage device to the computer via a communication path.

The functions of the switching simplifier 320, the receiver 321, the option determiner 322, the schedule adding/modifying/deleting unit 323, the identifier acquirer 324, and the meta-information establisher 325 are provided by a microprocessor (the CPU (not shown) of the management server 301 in this embodiment) of the computer executing the corresponding programs stored in an internal storage device (such as a memory (not shown) of the management server 301 in this embodiment). Alternatively, the programs stored on a recording medium may be read and executed by the computer.

(B) Operations

The site switching process carried out in the information processing system 1 equipped with the virtual storage devices 100 and 200 according to an embodiment will now be described.

Figure 9:
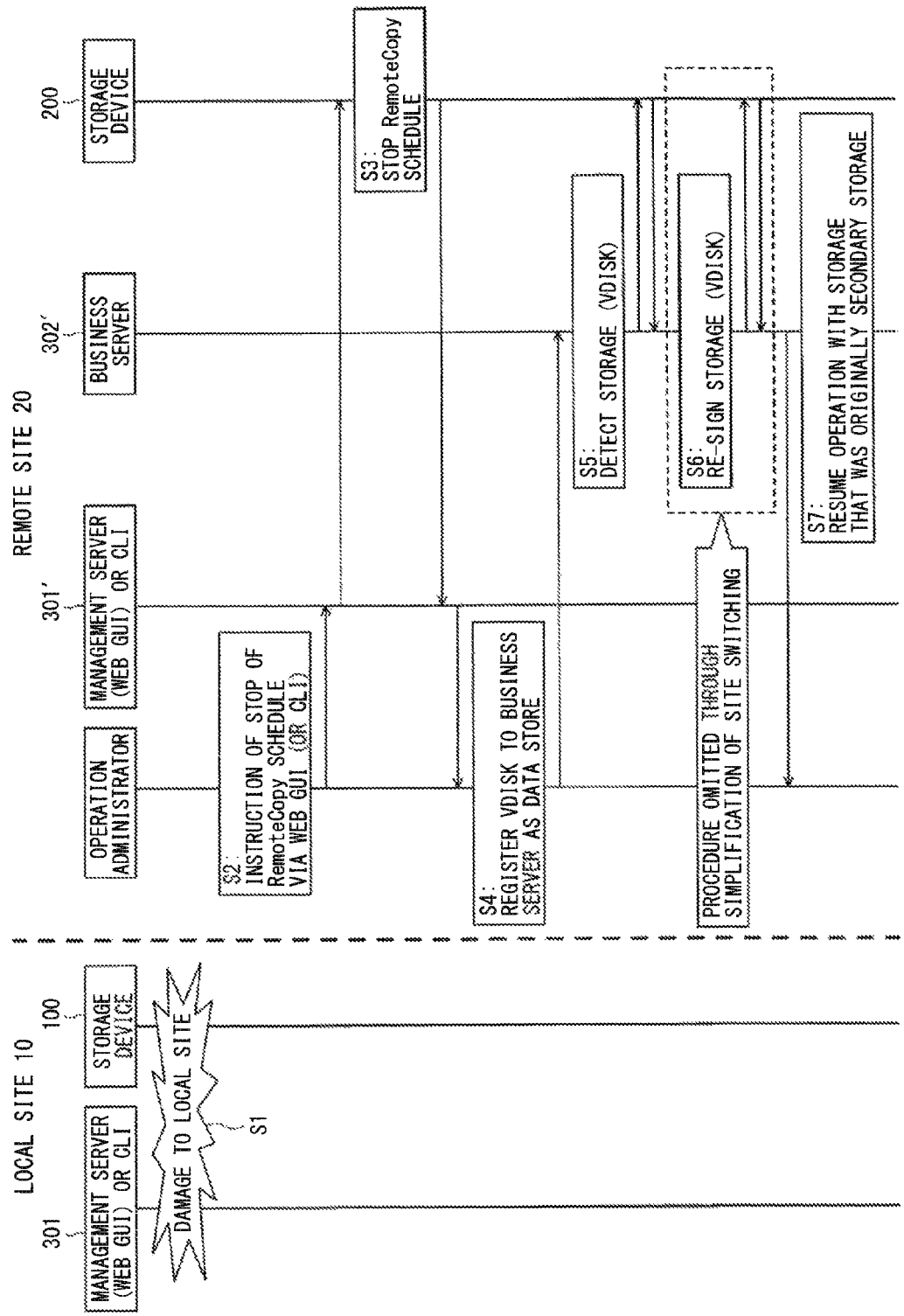
FIG. 9 illustrates the outline of a site switching process carried out when a local site of a virtual storage device is damaged in a disaster.

FIG. 9 illustrates the outline of the site switching process carried out when the local site 10 in the information processing system 1 is damaged in a disaster.

In Step S1, the local site 10 is damaged in a disaster.

In Step S2, an operation administrator of the information processing system 1 instructs the cancellation of a schedule of remote copy of the virtual storage device 200 with a web GUI or CLI of the management server 301' (refer to FIG. 3) at the remote site 20.

In Step S3, the schedule of remote copy of the virtual storage device 200 at the remote site 20 is cancelled.

In Step S4, the operation administrator instructs the registration of a VDISK 400 in the virtual storage device 200 at the remote site 20 as a data store.

In Step S5, the business server 302' detects the VDISK 400 of the virtual storage device 200.

In Step S6, the identifier spoofer 313 of the storage control unit 124 rewrites (spoofs) the value of the NAA identifier of an S-VDISK 400 to the same value as that of the NAA identifier of the P-VDISK 400. This operation skips the resigning of the VDISK 400 through the simplified site-switching process.

In Step S7, the secondary site 20 substitutes for the primary site 10, and the business server in the new primary site resumes operation using the VDISKs 400 at the new primary site 10.

The processes mentioned above will now be described in detail with reference to FIGS. 10 and 11.

Figure 10:
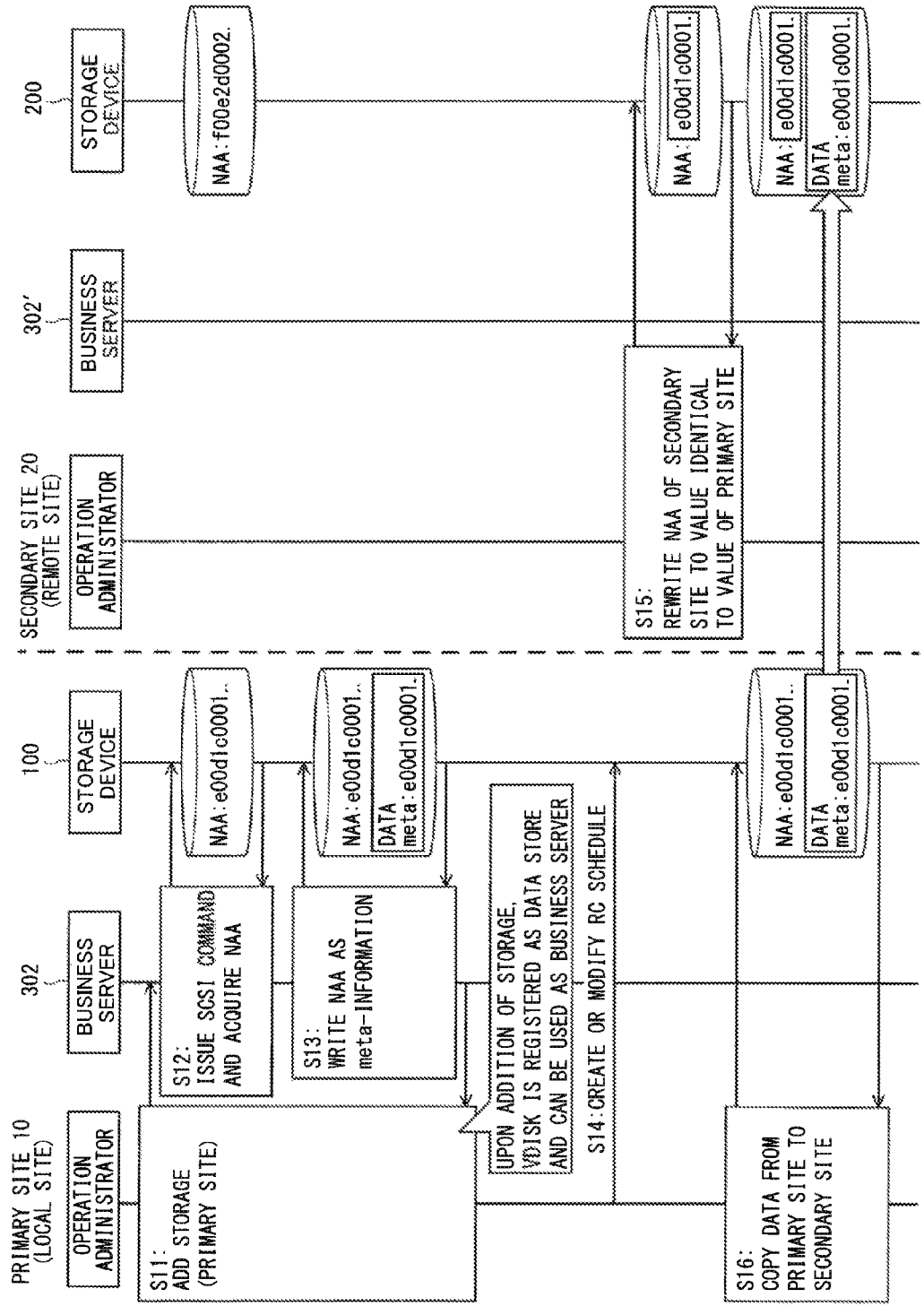
FIG. 10 illustrates a remote copy process carried out between virtual storage devices according to an embodiment.

FIG. 10 illustrates a remote copy process carried out between the virtual storage devices 100 and 200 according to an embodiment. FIG. 11 illustrates the process of adding a VDISK 400 having a false identifier to the virtual storage device 200 according to an embodiment. The process in FIG. 10 is carried out after the local site 10 is damaged, as illustrated in FIG. 9. The process in FIG. 11 is carried out before the local site 10 is damaged, as illustrated in FIG. 9. FIG. 12 is a table showing the processes illustrated in FIGS. 10 and 11.

The process in FIG. 9 that is carried out before the local site 10 is damage will now be described with reference to FIGS. 10 and 12.

In Step S11, the operation administrator instructs the addition of a P-VDISK 400 via a web GUI or CLI of the management server 301 at the primary site 10.

In Step S12, the identifier acquirer 324 of the switching simplifier 320 instructs the business server 302 at the primary site 10 to send a SCSI command to the virtual storage device 100 to acquire the NAA identifier of the P-VDISK 400. With reference to FIG. 10, the identifier receiver 312 acquires "e00dc001 . . . " as the value of the NAA identifier of the P-VDISK 400.

In Step S13, the meta-information establisher 325 instructs the business server 302 to write the NAA identifier of the P-VDISK 400 acquired in Step S12 in the meta-information in the P-VDISK 400. With reference to FIG. 10, the identifier spoofer 313 writes the value "e00dc001 . . . " in the meta-information in the P-VDISK 400 to add the P-VDISK 400 to the ESXi data store. After the P-VDISK 400 is added in Step S13, the P-VDISK 400 is registered as a data store and can be used by the ESXi running in the business server 302.

In Step S14, the operation administrator of the information processing system 1 instructs the spoofing of the identifier of the P-VDISK 400 added to the primary site 10 in Step S11. The operation administrator operates the management server 301 at the primary site 10 to create or modify the schedule of remote copy so as to instruct the spoofing of the identifier.

In Step S15, the identifier receiver 312 of the storage control unit 124 receives the NAA identifier of the P-VDISK 400 at the primary site 10. The identifier spoofer 313 sets the value of the NAA identifier of an S-VDISK 400 at the secondary site 20 to the value identical to that of the NAA identifier of the P-VDISK 400 at the primary site 10. The identifier spoofer 313 writes the value of the NAA identifier of the P-VDISK 400 received by the identifier receiver 312 in the false-identifier storage area 722 corresponding to the S-VDISK 400 in the identifier spoofing table 720 (refer to FIG. 8). With reference to FIG. 10, the value "e00dc001 . . . " of the NAA identifier of the P-VDISK 400 is written in the false-identifier storage area 722 corresponding to the S-VDISK 400 in the identifier spoofing table 720.

In Step S16, the remote-copy executer 315 duplicates the data in the P-VDISK 400 to the S-VDISK 400.

The process carried out after the local site 10 is damaged in a disaster as illustrated in FIG. 9 will now be described with reference to FIGS. 11 and 12.

In Step S21, the operation administrator instructs the addition of an S-VDISK 400 already storing a duplicate of the data in the P-VDISK 400 via the web GUI or CLI of the management server 301' at the secondary site 20.

In Step S22, the business server 302' at the secondary site 20 sends a SCSI command (NAA notification request) to the virtual storage device 200 to inquire about the NAA identifier of the S-VDISK 400. The identifier notifier 314 of the storage control unit 124 at the secondary site 20, which has received the NAA notification request, acquires the NAA identifier of the S-VDISK 400 and reports the NAA identifier to the business server 302'. With reference to FIG. 11, the identifier notifier 314 acquires the false value "e00dc001 . . . " as the value of the NAA identifier of the S-VDISK 400.

In Step S23, the business server 302' at the secondary site 20 compares the NAA identifier acquired in Step S22 with the meta-information, confirms that the values are identical (and thus skips the resigning process), and adds the S-VDISK 400 to the secondary site 20. After the S-VDISK 400 is added, the S-VDISK 400 is registered as an ESXi data store and can be used by the ESXi running in the business server 302'.

Figure 13:
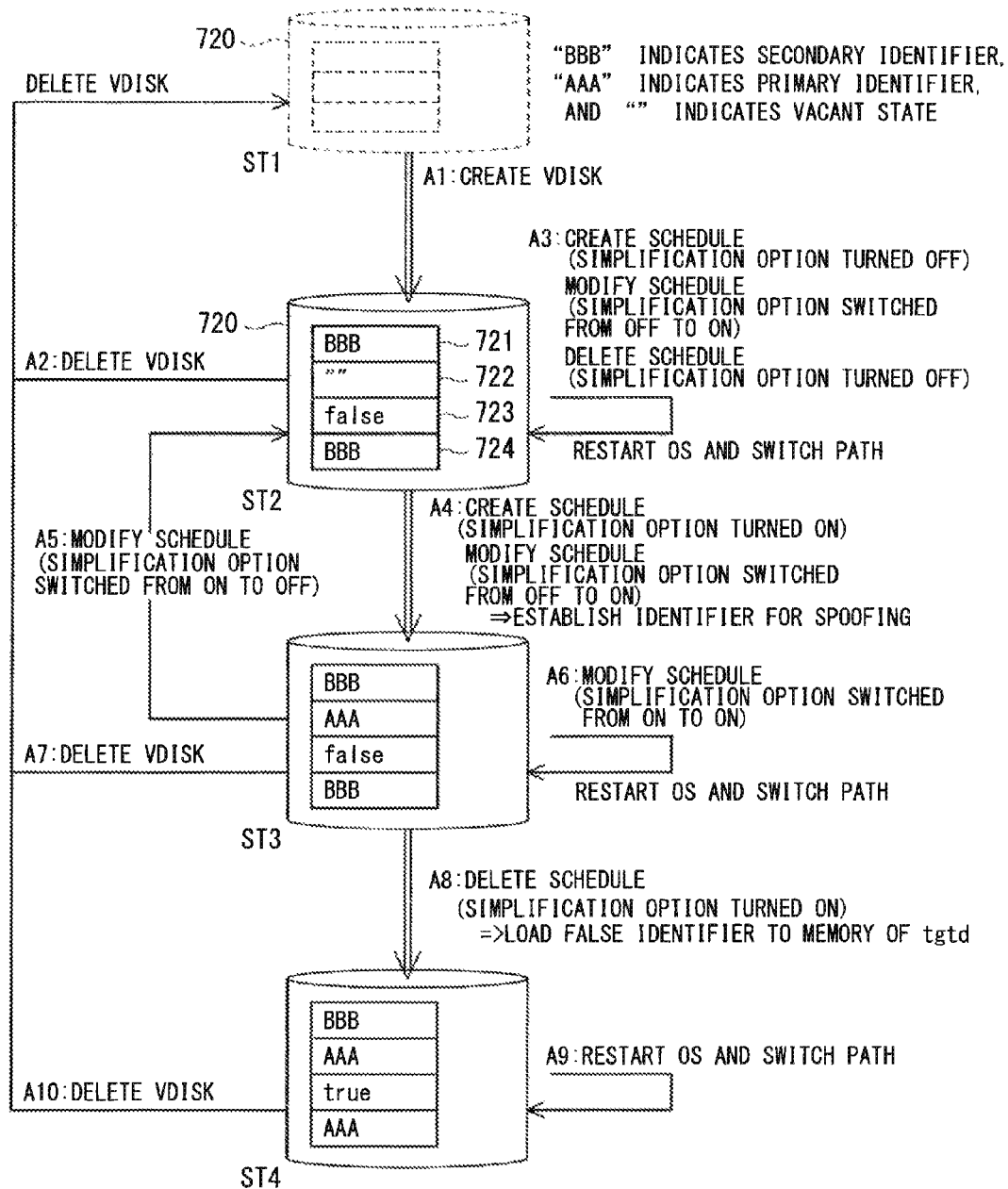
FIG. 13 is a schematic view illustrating the transition of a false identifier in a virtual storage device at a secondary site according to an embodiment.

FIG. 13 is a schematic view illustrating the transition of a false identifier in the virtual storage device 200 at the secondary site 20 according to an embodiment.

FIG. 13 illustrates the transition of an S-VDISK 400 at the secondary site 20 between different states.

The value of the NAA identifier of a P-VDISK 400 at the primary site 10 is "AAA," and the value of the NAA identifier of an S-VDISK 400 at the secondary site 20 is "BBB."

In a state ST1, the S-VDISK 400 is not created or is deleted.

The S-VDISK 400 created in the state ST1 transitions to a state ST2 (indicated by the arrow A1), and an entry of this VDISK 400 is added to the identifier spoofing table 720.

In the state ST2, the value of the identifier spoofing table 720 is modified if a schedule is created while the simplification option is turned off (invalid), the schedule is modified while the simplification option is turned on (valid), a schedule is deleted, the OS is restarted, or the path is switched. Such operations do not cause a transition of the state, as indicated by the arrow A3.

In the virtual storage devices 100 and 200 according to an embodiment, the simplified site switching can be turned on or off through the assignment of a simplification option during the creation, modification, or deletion of the schedule of remote copy. To turn on the simplified site switching, the simplification option should set be to "on", and to turn off the simplified site switching, the simplification option should be set to "off."

In the state ST2, if a schedule is created or modified while the simplification option is set to "on," the state of the S-VDISK 400 transitions to a state ST3. The value in the identifier spoofing table 720 is modified (refer to the arrow A4). The NAA identifier of the P-VDISK 400 is sent to and stored in the S-VDISK 400.

If the S-VDISK 400 is deleted in the state ST2, the state of the S-VDISK 400 transitions from ST2 to ST 1 (refer to the arrow A2).

In the state ST3, the original NAA identifier of the S-VDISK 400 is acquired even if an inquiry command is sent to the S-VDISK 400 and the NAA identifier of the S-VDISK 400 is acquired. Thus, multiple VDISKs 400 having the same NAA identifier do not exist in the information processing system 1.

In the State ST3, the value of the identifier spoofing table 720 is modified if a schedule is created while the simplification option is turned on, the OS is restarted, or the path is switched, but the state transition of the S-VDISK 400 does not occur (refer to the arrow A6).

In the state ST3, remote copy is performed from the P-VDISK 400 at the primary site 10 to the S-VDISK 400 at the secondary site 20.

In the state ST3, if the schedule is modified while the simplification option is set to "off," the value in the identifier spoofing table 720 is modified and the state of the S-VDISK 400 returns to ST2 (refer to the arrow A5).

If the S-VDISK 400 is deleted in the state ST3, the state of the S-VDISK 400 transitions from ST3 to ST1 (refer to the arrow A7).

If the primary site 10 is damaged in the state ST3, the operation administrator sets the simplification option to "on" to delete the schedule of remote copy via a GUI or CLI. This causes the state of the S-VDISK 400 to transition to a state ST4 (refer to the arrow A8), and the NAA identifier stored in the S-VDISK 400 is loaded in a memory (not shown) in a tgtd 615 (refer to FIGS. 16 and 17).

If the OS is restarted or the path is switched in the state ST4, the value in the identifier spoofing table 720 is modified but the state transition does not occur (refer to the arrow A9).

If the S-VDISK 400 is deleted in the state ST4, the state of the S-VDISK 400 transitions from ST4 to ST1 (refer to the arrow A10).

Figure 14:
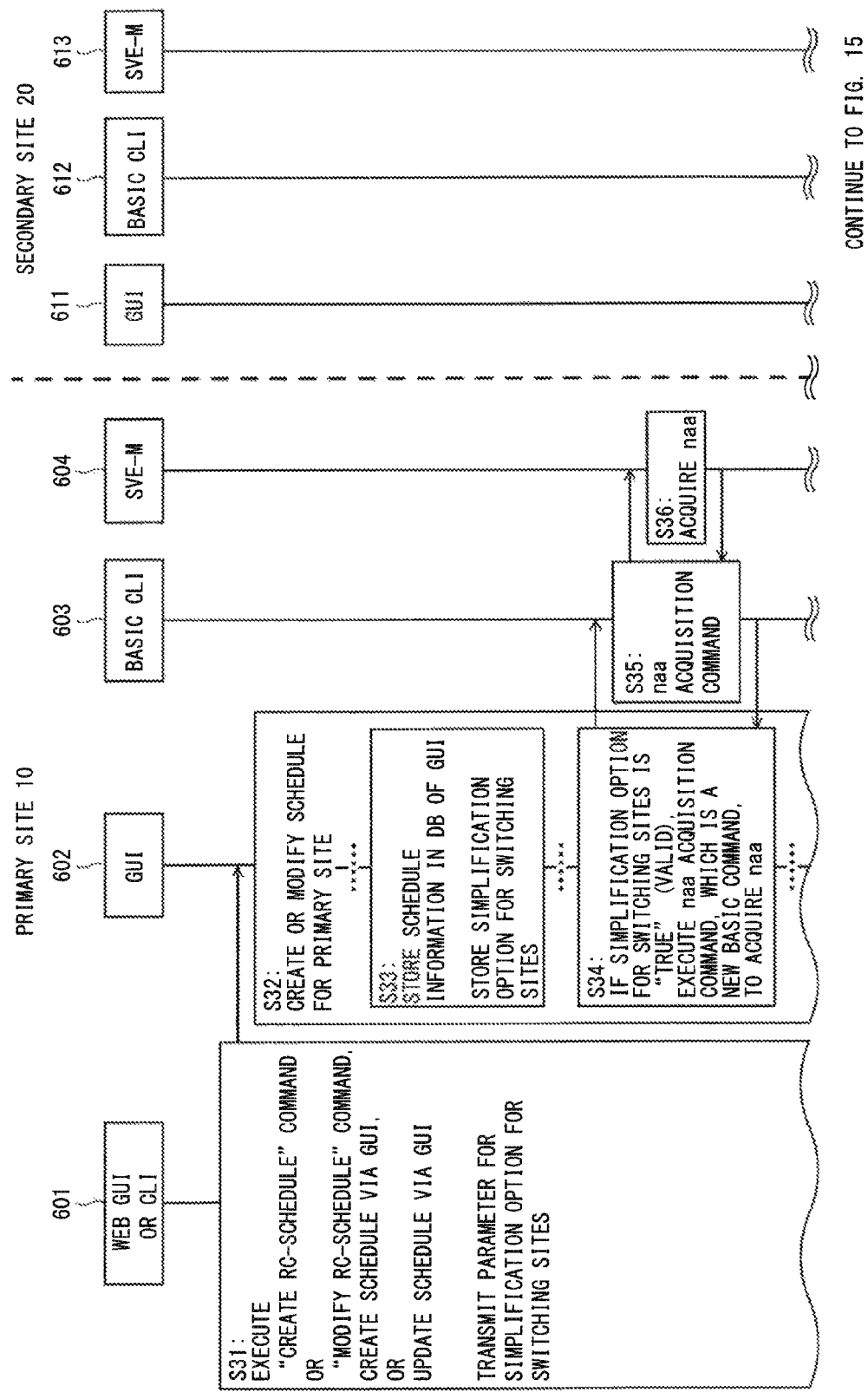
FIG. 14 illustrates the creation or modification of a schedule of remote copy as modules in a virtual storage device according to an embodiment.
Figure 15:
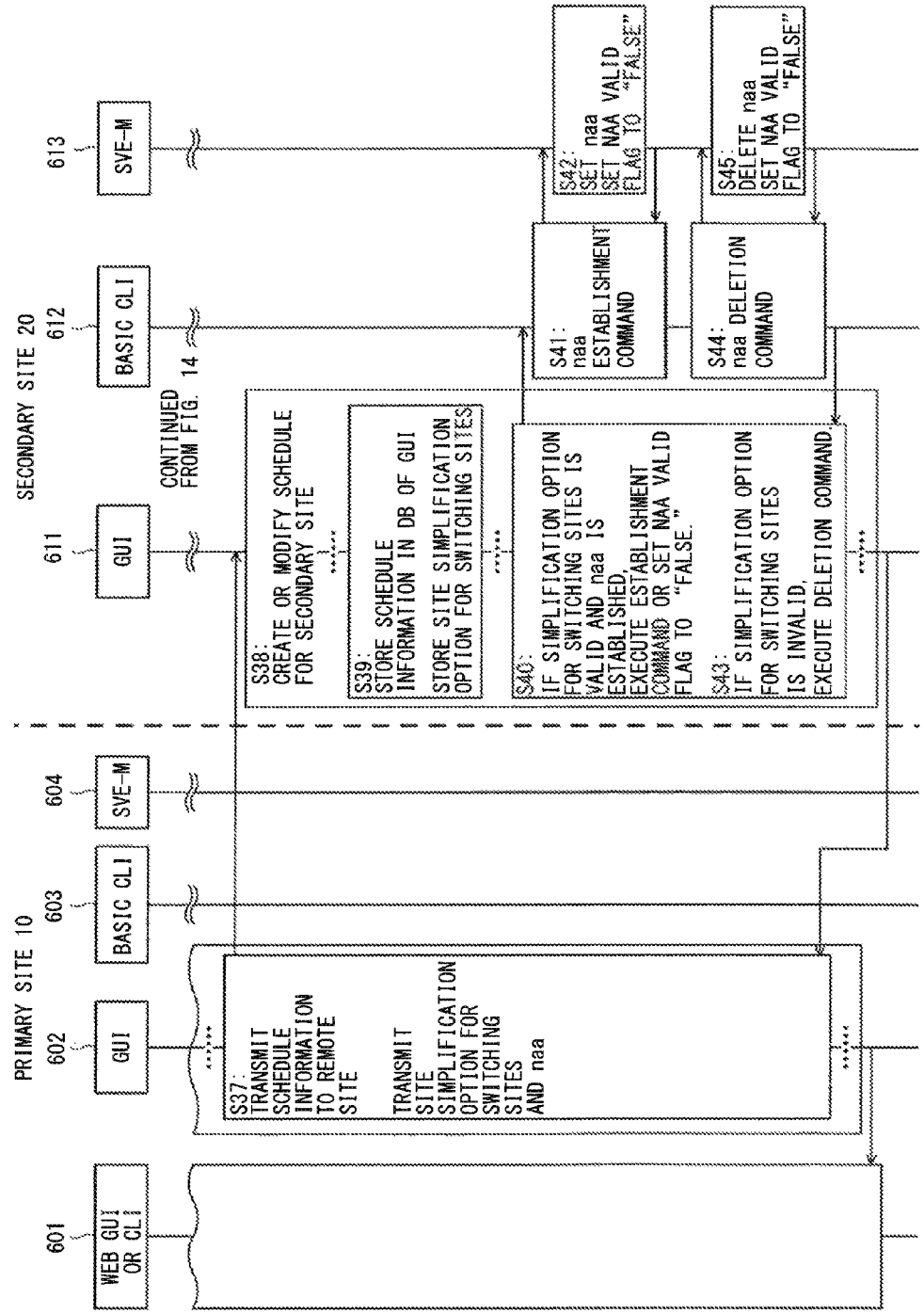
FIG. 15 illustrates the creation or modification of a schedule of remote copy as modules in a virtual storage device according to an embodiment.

FIGS. 14 and 15 illustrate the creation or modification of a schedule of remote copy as modules in the virtual storage devices 100 and 200 according to an embodiment.

The creation or modification of a schedule is only possible at the primary site 10. A schedule cannot be created or modified at the secondary site 20.

FIGS. 14 and 15 illustrate GUIs 602 and 611, which are modules that provide GUIs.

The basic CLIs 603 and 612 are respectively commands for the configuration management of SVE-Ms 604 and 613, which are described below, and the acquisition of configuration information.

The SVE-Ms 604 and 613 are daemon programs that run in a PU 11 (PU 11-1 in FIG. 5) having a cluster controller 703-1 and manages and controls the configuration of storage virtualization engines (SVEs) that provide virtual storage. The SVE-Ms 604 and 613 are equivalent to the volume manager 707 in FIG. 5.

In Step S31, the operation administrator issues a "create rc-schedule" or "modify rc-schedule" command via a CLI at the primary site 10 to create or modify the schedule of remote copy. The operation administrator assigns the simplification option of site switching as a parameter of the "create rc-schedule" or "modify rc-schedule" command.

Alternatively, the operation administrator may create or modify the schedule of remote copy with the web GUI.

In Step S32, the GUI 602 creates or modifies a schedule at the primary site 10.

Specifically, in Step S33, the GUI 602 stores information on the schedule created or modified in Step S31 together with a simplification option of site switching in a database of the GUI 602 (not shown).

If the simplification option of site switching for the schedule created or modified in Step S31 is set to "true (valid)," the GUI 602 executes an NAA acquisition command, which is a new basic command, in Step S34.

In Step S35, the basic CLI 603 executes the NAA acquisition command.

In Step S36, the SVE-M 604 acquires an NAA identifier and sends the acquired NAA identifier to the GUI 602 via the basic CLI 603.

In Step S37, the GUI 602 sends the information on the schedule created or modified in Step S31 together with a simplification option of site switching and an NAA identifier to the GUI 611 at the secondary site 20.

In Step S38, the GUI 611 creates or modifies a schedule at the secondary site 20.

Specifically, in step S39, the GUI 611 stores the information on the schedule together with the simplification option of site switching in a database of the GUI 611 (not shown).

In Step S40, if the simplification option of site switching in the schedule is "true (valid)" and an NAA identifier is established, the GUI 611 executes a schedule establishment command and sets the NAA valid flag to "false."

In Step S41, the basic CLI 612 executes the NAA acquisition command.

In Step S42, the SVE-M 613 sets the value of the NAA identifier and sets the NAA valid flag to "false."

If the simplification option of site switching in the schedule is set to "false (invalid)," the GUI 611 executes a schedule deletion command, in Step S43.

In Step S44, the basic CLI 612 executes the NAA deletion command.

In Step S42, the SVE-M 613 deletes the NAA identifier and sets the NAA valid flag to "false."

Figure 16:
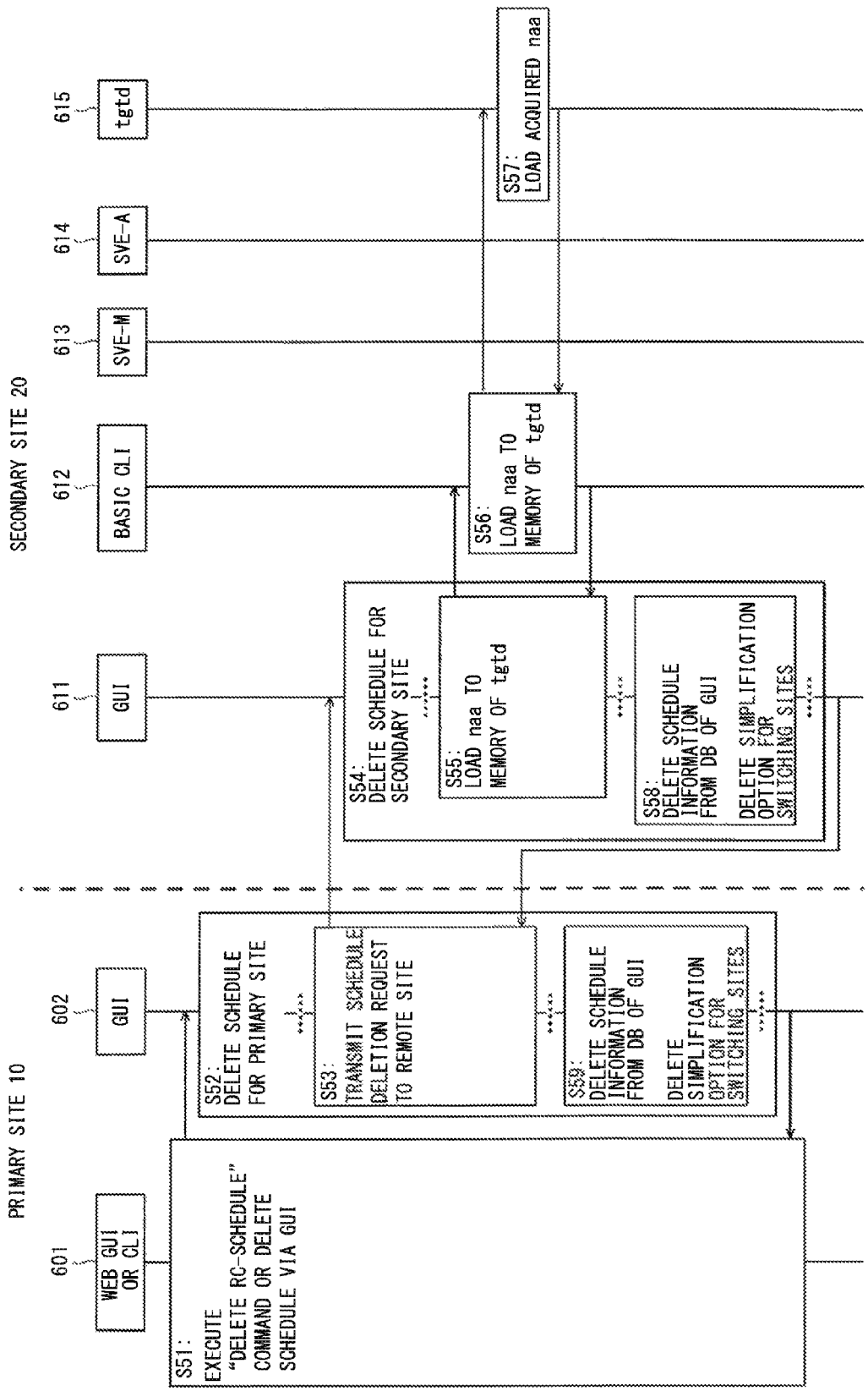
FIG. 16 illustrates a deletion process of a schedule of remote copy in modules in a virtual storage device according to an embodiment.

FIG. 16 illustrates the deletion process of a schedule of remote copy in modules in the virtual storage devices 100 and 200 according to an embodiment.

An NAA identifier contains a serial number unique to the VX and a volume number unique to the created volume, and is primarily unique to each volume. Thus, if the simplified site switching is turned on, volumes having the same NAA identifier will simultaneously exist at the primary site 10 and the secondary site 20 once the schedule is deleted.

To prevent volumes having non-unique, identical NAA identifiers from simultaneously existing at the primary site 10 and the secondary site 20, the volume at the primary site 10 is deleted at the same timing as the schedule is deleted.

With reference to FIG. 16, the tgtd 615 is a daemon program managing iSCSI target information. Since the tgtd 615 is known, description thereof will be omitted.

In Step S51, the operation administrator issues a "delete rc-schedule" command with the CLI at the primary site 10 to delete the schedule of remote copy.

Alternatively, the operation administrator may delete the schedule of remote copy with the web GUI.

In Step S52, the GUI 602 deletes the schedule at the primary site 10.

Specifically, in Step S53, the GUI 602 sends a request for deletion of the schedule to the GUI 611 at the secondary site 20.

In Step S54, the GUI 611 deletes the schedule.

Figure 17:
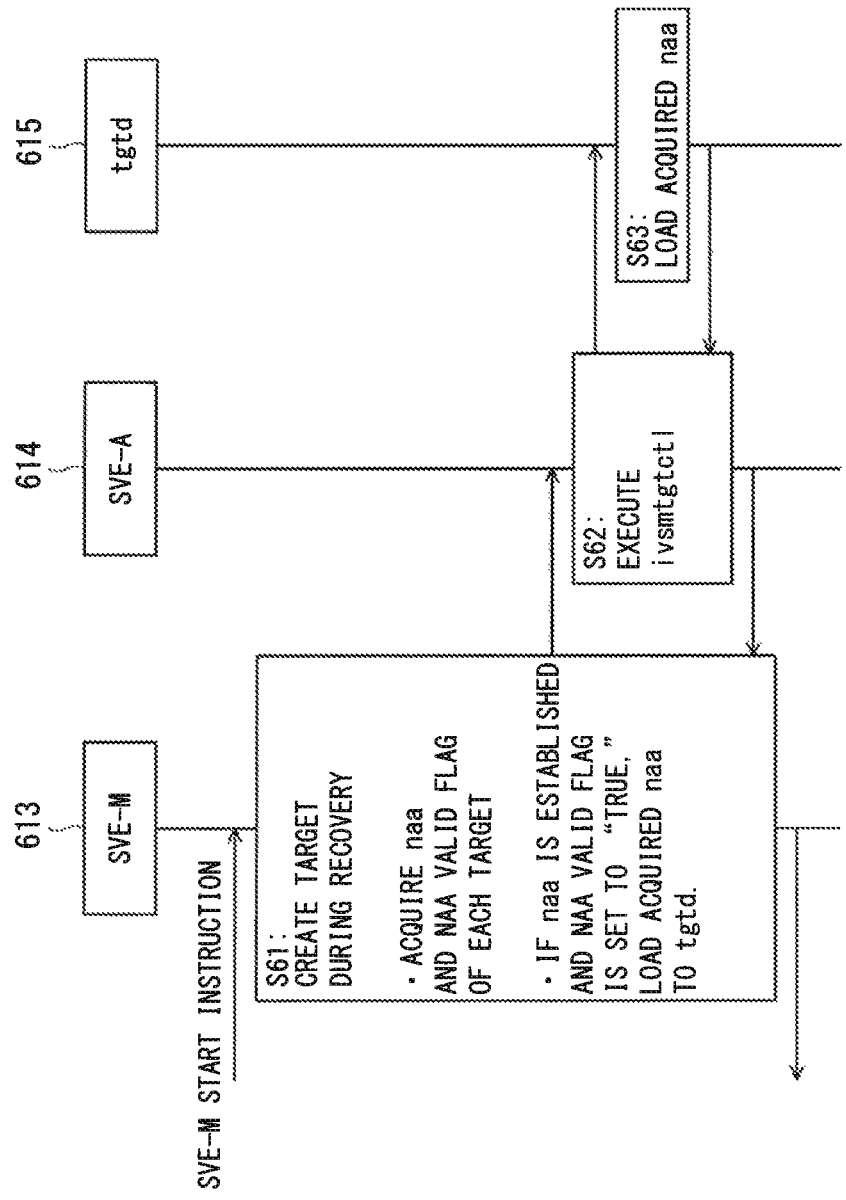
FIG. 17 illustrates modules for a recovery process carried out during the start of an OS of a virtual storage device according to an embodiment.

Specifically, in Step S55, the GUI 611 loads an NAA identifier to a memory (not shown) in the tgtd 615 (refer to FIGS. 16 and 17).

In Step S56, the basic CLI 612 loads the NAA identifier to the memory of the tgtd 615.

In Step S57, the tgtd 615 loads the acquired NAA identifier to the memory.

In Step S58, the GUI 611 deletes the information on the schedule and the simplification option of site switching from the data base (not shown) in the GUI 611.

In Step S59, the GUI 602 at the primary site 10 deletes the information on the schedule and the simplification option of site switching from the data base (not shown) in the GUI 602.

The schedule can also be deleted from the secondary site 20. If the operation administrator instructs the deletion of the schedule from the secondary site 20, a process corresponding to Step S54 and the subsequent steps for only the secondary site 20 are carried out.

FIG. 17 illustrates the modules for a recovery process carried out during the start of the OS of the virtual storage devices 100 and 200 according to an embodiment.

The SVE-1 614 is a daemon program that operates in every PU 11 and monitors events, such as driver control and errors. The SVE-1 614 is equivalent to the volume management agents 709-1 to 709-3 in FIG. 5.

In this process, the NAA information in the memory of the tgtd 615 is restored during scale-out, path switching, or restart of the PU 13.

The virtual storage device 200 is restored to the state before the restart during the start of the OS of the virtual storage device 200. Thus, damage recovery is carried out. During the damage recovery, the NAA information in the memory of the tgtd 615 is restored.

The virtual storage device 200 is restarted, the PU 13 is restarted, and the recovery process is carried out. In Step S61, a target creation process is carried out. In the target creation process, information on volume connection is loaded to the memory 502 in the PU 11.

Specifically, the SVE-M 613 at the secondary site 20 acquires the NAA and the NAA valid flag of each target. A target contains information on volume connection created in the restarted PU 11 before the restart. An NAA valid flag indicates whether a false NAA identifier of a target volume is loaded to the memory of the tgtd 615.

If the NAA identifier of a target is established and an NAA valid flag is set, the SVE-M 613 loads the acquired NAA identifier to the memory of the tgtd 615.

In Step S62, the SVE-A 614 executes ivsmtgtctl to load the NAA identifier to the memory of the tgtd 615. The ivsmtgtctl is a command for instructing the analysis of the parameters sent from the SVE-A 614 and requesting target operation by the tgtd 615.

In Step S63, the tgtd 615 loads the acquired NAA identifier to the memory.

The operation of the storage control unit 124 will now be described.

Figure 18:
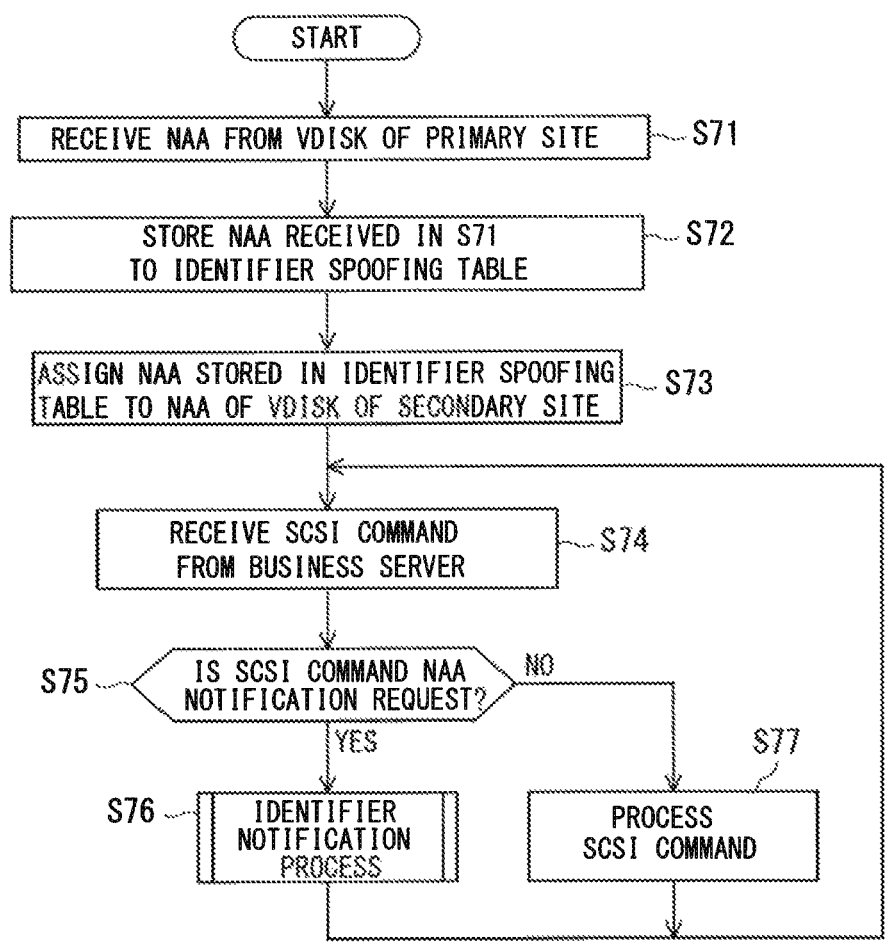
FIG. 18 is a flow chart illustrating the process carried out by a storage control unit at a secondary site according to an embodiment.

FIG. 18 is a flow chart illustrating the process (Steps S71 to S77) carried out by the storage control unit 124 at the secondary site 20 according to an embodiment.

In Step S71, the identifier receiver 312 of the storage control unit 124 at the secondary site 20 receives the NAA identifier of an original VDISK 400 at the primary site 10.

In Step S72, the identifier receiver 312 stores the NAA identifier of the original VDISK 400 received in Step S71 in the identifier spoofing table 720.

In Step S73, the identifier spoofer 313 issues a command for adding or modifying a schedule of remote copy to rewrite the value of the NAA identifier of the S-VDISK 400 received in Step S71 to the value of NAA identifier of the P-VDISK 400.

In Step S74, the storage control unit 124 waits for a SCSI command from the business servers 302 and 302' and receives the SCSI command.

In Step S75, the storage control unit 124 determines whether the SCSI command received in Step S74 is an NAA notification request. An NAA notification request is a SCSI command issued by the business servers 302 and 302' to inquire about the NAA identifier of the original VDISK 400.

If the SCSI command received in Step S74 is an NAA notification request (YES in Step S75), the remote-copy executer 315 carries out the identifier notification process, which is described below with reference to FIG. 19, in Step S76. The process then returns to Step S74.

If the SCSI command received in Step S74 is a SCSI command other than an NAA notification request (NO in Step S75), the storage control unit 124 appropriately processes the SCSI command in accordance with the content of the SCSI command, in Step S77.

Figure 19:
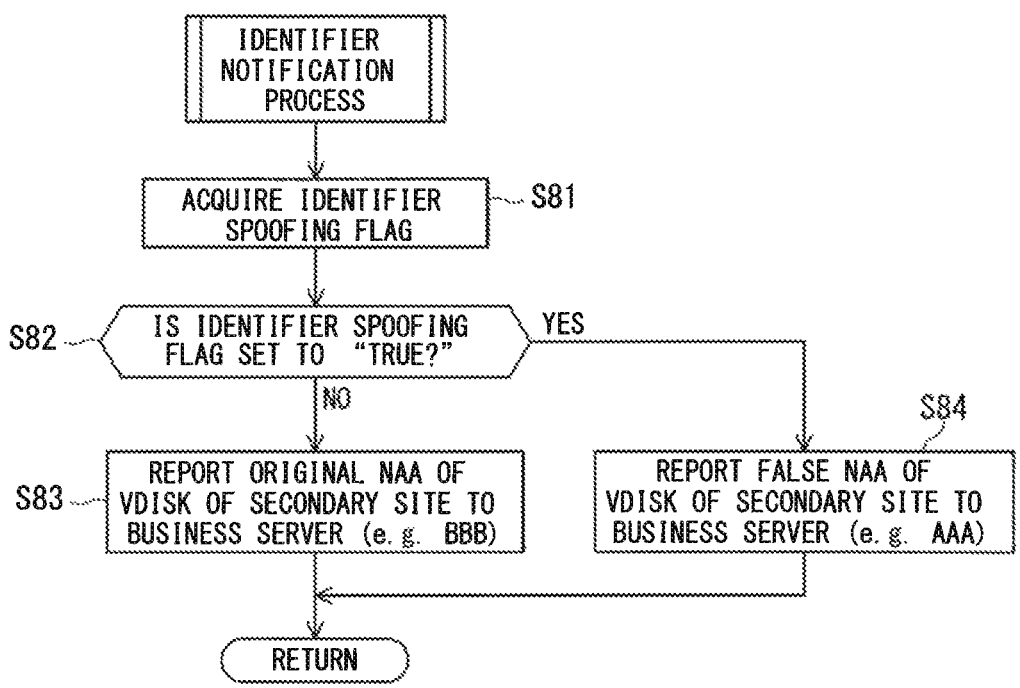
FIG. 19 is a flow chart illustrating an identifier notification process carried out by an identifier notifier according to an embodiment.
Figure 20:
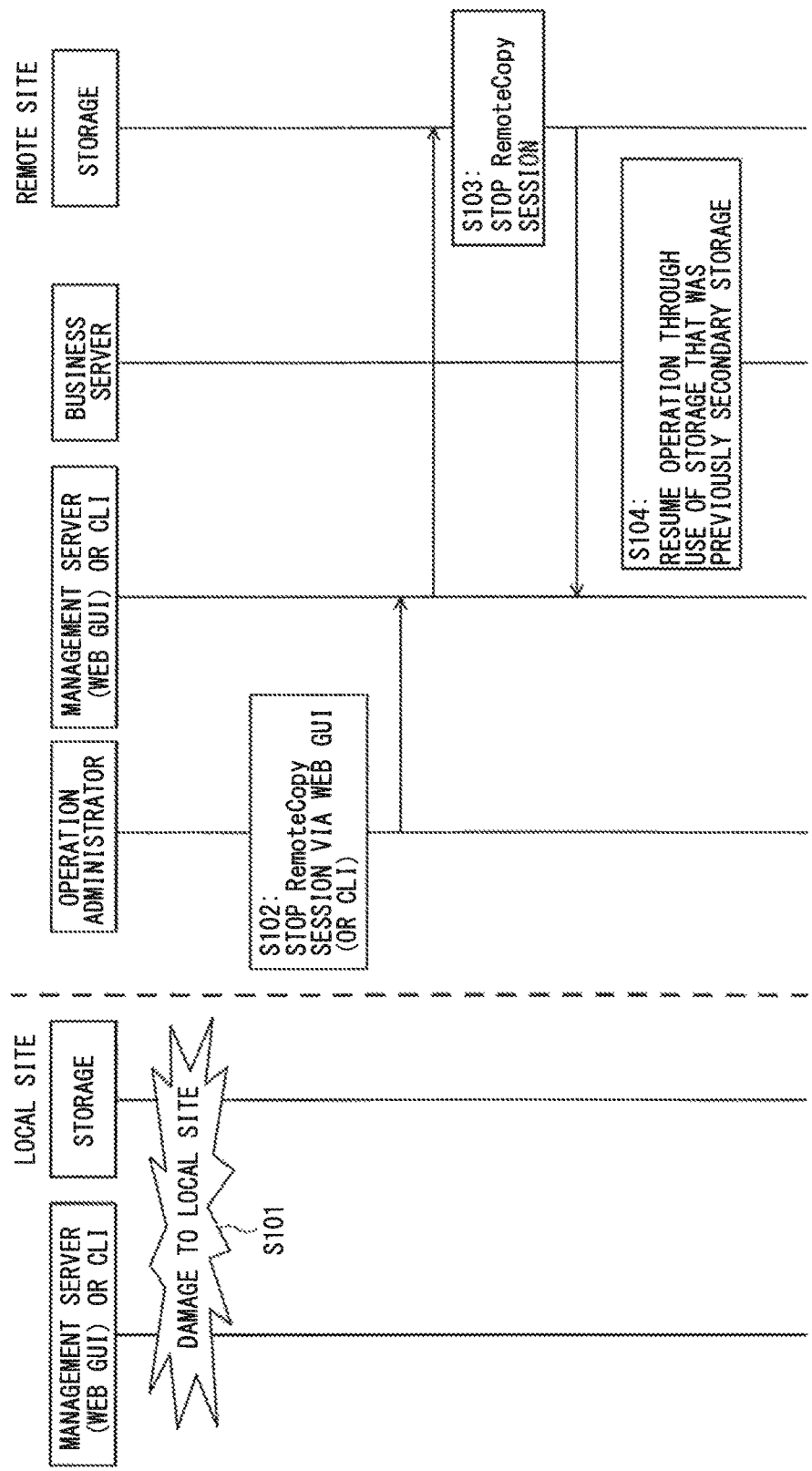
FIG. 20 illustrates a site-switching process in a conventional virtual storage system in case a local site is damaged by a disaster.

FIG. 19 is a flow chart illustrating the identifier notification process (Steps S81 to S84) carried out by the identifier notifier 314 according to an embodiment.

In Step S81, the identifier notifier 314 acquires the value of the identifier spoofing flag 723 of the duplicated VDISK 400 from the identifier spoofing table 720.

In Step S82, the identifier notifier 314 determines whether identifier spoofing is performed on the duplicated VDISK 400 based on the identifier spoofing flag 723 acquired in Step S81. For example, if the value of the identifier spoofing flag 723 acquired in Step S81 is "true," the identifier notifier 314 determines that identifier spoofing is performed on the duplicated VDISK 400.

If identifier spoofing is not performed on the duplicated VDISK 400 (NO in Step S82), the remote-copy executer 315 reports the value in a identifier storage area 721 in the identifier spoofing table 720, which is the value of the original NAA identifier of the duplicated VDISK 400, to the business servers 302 and 302', in Step S83. For example, if the duplicated VDISK 400 is in the state ST2 illustrated in FIG. 13, the remote-copy executer 315 reports "AAA" as the value of the NAA identifier of the duplicated VDISK 400 to the business servers 302 and 302'. That is, if identifier spoofing is not performed, the identifier notifier 314 reports the original NAA identifier (without spoofing) of the duplicated VDISK 400 to the business servers 302 and 302'.

The identifier notification process then ends, and the process returns to Step S74 in FIG. 18.

If identifier spoofing is performed on the duplicated VDISK 400 (YES in Step S82), the remote-copy executer 315 reports the value in the false-identifier storage area 722 of the identifier spoofing table 720 as the value of the NAA identifier of the duplicated VDISK 400 to the business servers 302 and 302', in Step S84. For example, in the state ST4 in FIG. 13, the remote-copy executer 315 reports "BBB" as the value of the NAA identifier of the duplicated VDISK 400 to the business servers 302 and 302'. That is, if identifier spoofing is performed, the identifier notifier 314 reports the NAA identifier spoofed by the identifier spoofer 313 to the business servers 302 and 302'.

The identifier notification process then ends, and the process returns to Step S74 in FIG. 18.

(C) Advantageous Effects

According to the virtual storage devices 100 and 200 according to the embodiments, the value of the NAA identifier of an S-VDISK 400 of the secondary site 20 is set to the same value as that of the NAA identifier of the P-VDISK 400 at the primary site 10. In this way, the resigning (re-registration) of the S-VDISK 400 in the scale-out virtual storage device 200, which is a time-consuming process, can be skipped. Thus, the time can be reduced for switching to the site of the virtual storage device 200, for example, when the virtual storage device 100 is damaged.

The remote copy of data from the P-VDISK 400 at the primary site 10 to an S-VDISK 400 at the secondary site 20 is performed through the selection of a simplification option or the creation or modification of a schedule of remote copy. In this way, the addition of a new command for remote copy is unnecessary. The modification of the schedule of remote copy can turn on and off the simplified site switching.

(D) Others

The techniques disclosed in the present invention should not be limited to the embodiments described above and may be modified in various ways within the scope of the embodiments.

For example, according to the embodiments described above, two PUs 11 are connected to a single SU 13. Alternatively, one PU 11 or three or more PUs 11 may be connected to each SU 13.

According to the embodiments described above, the primary site 10 and the secondary site 20 are respectively equipped with management servers 301 and 301' and business servers 302 and 302'. If the virtual storage device 100 has been replaced, the management server 301 and the business server 302 may be installed at only the primary site 10.

According to the embodiments described above, VMWare ESXi provides a virtual environment. Alternatively, any other virtual environment may be used.

According to the embodiments described above, in Step S73 in FIG. 18, the identifier spoofer 313 issues a command for the addition or modification of the schedule of remote copy to rewrite the value of the NAA identifier of the S-VDISK 400 to the value of the NAA identifier of the P-VDISK 400. Alternatively, the NAA identifier may be rewritten with other known commands. Alternatively, the identifier spoofer 313 may spoof the identifier in response to a new command for setting the NAA identifier.

The techniques described above can reduce the time required for switching between sites of virtual storage devices.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage processing apparatus that controls a second volume of a second virtual storage device storing a duplicate of a first volume of a first virtual storage device, the storage processing apparatus comprising:
a first storage area that stores a second identifier of the second volume;
a second storage area that stores a first identifier of the first volume received from the first virtual storage device as a false-identifier;
a third storage area that stores a flag that indicates whether the false-identifier stored in the second storage area is valid; and
a controller that establishes the first identifier stored in the second storage area as a second identifier of the second volume, when the flag indicates that the false-identifier is valid, and
notifies the first identifier established as the second identifier of the second volume, in response to a notification request of the second identifier.

2. The storage processing apparatus according to claim 1, wherein,
the second virtual storage device is capable of adding another volume,
the controller adds a volume to the second virtual storage device, and
the controller establishes an identifier of an original volume for the added volume.

3. The storage processing apparatus according to claim 1, wherein, in response to reception of an instruction for creating a new remote copy schedule or modifying the remote copy schedule, the controller establishes the first identifier as an identifier of the second volume of the second virtual storage device to skip re-registration of the second volume to the second virtual storage device.

4. A non-transitory computer-readable recording medium storing a storage control program for controlling a second volume of a second virtual storage device storing a duplicate of a first volume of a first virtual storage device, the program causing a computer to:
store a second identifier of the second volume;
store a first identifier of the first volume received from the first virtual storage device as a false-identifier;
store a flag that indicates whether the false-identifier stored in the second storage area is valid;
establish the first identifier stored in the second storage area as a second identifier of the second volume, when the flag indicates that the false-identifier is valid; and
notify the first identifier established as the second identifier of the second volume, in response to a notification request of the second identifier.

5. The non-transitory computer-readable recording medium according to claim 4, wherein,
the second virtual storage device is capable of adding another volume, and
the program further permitting a computer to add a volume to the second virtual storage device.

6. The non-transitory computer-readable recording medium according to claim 4, wherein, in response to reception of an instruction for creating a new remote copy schedule or modifying the remote copy schedule, the first identifier is established as an identifier of the second volume of the second virtual storage device to skip re-registration of the second volume to the second virtual storage device.

7. A storage system comprising:
a first virtual storage device comprising a first volume; and
a second virtual storage device comprising a second volume,
the first virtual storage device further comprising:
a first storage area that stores a second identifier of the second volume;
a second storage area that stores a first identifier of the first volume received from the first virtual storage device as a false-identifier;
a third storage area that stores a flag that indicates whether the false-identifier stored in the second storage area is valid; and
a controller that establishes the first identifier stored in the second storage area as a second identifier of the second volume, when the flag indicates that the false-identifier is valid, and notifies the first identifier established as the second identifier of the second volume, in response to a notification request of the second identifier.

8. The storage system according to claim 7, wherein, the second virtual storage device is capable of adding another volume, the controller adds a volume to the second virtual storage device, and the controller establishes an identifier of an original volume for the added volume.

9. The storage system according to claim 7, wherein, in response to reception of an instruction for creating a new remote copy schedule or modifying the remote copy schedule, the controller establishes the first identifier as an identifier of the second volume of the second virtual storage device to skip re-registration of the second volume to the second virtual storage device.

* * * * *